United States Patent
Weil et al.

(10) Patent No.: US 10,037,185 B2
(45) Date of Patent: Jul. 31, 2018

(54) DIGITAL MEDIA MESSAGE GENERATION

(71) Applicant: NightLight Systems LLC, Wilmington, DE (US)

(72) Inventors: Joseph Weil, Novato, CA (US); Andrew Jarecki, New York, NY (US); William Joseph Martinez, San Francisco, CA (US)

(73) Assignee: NightLight Systems LLC, Wilmington, DE (US)

( * ) Notice: Subject to any disclaimer, the term of this patent is extended or adjusted under 35 U.S.C. 154(b) by 324 days.

(21) Appl. No.: 14/683,779

(22) Filed: Apr. 10, 2015

(65) Prior Publication Data

US 2016/0048373 A1 Feb. 18, 2016

Related U.S. Application Data

(63) Continuation-in-part of application No. 14/569,169, filed on Dec. 12, 2014.
(Continued)

(51) Int. Cl.
*G06F 3/048* (2013.01)
*G06F 3/16* (2006.01)
(Continued)

(52) U.S. Cl.
CPC ............. *G06F 3/167* (2013.01); *G06F 3/017* (2013.01); *G06F 3/04842* (2013.01);
(Continued)

(58) Field of Classification Search
CPC .................. H04N 5/265–5/272; H04N 21/854
See application file for complete search history.

(56) References Cited

U.S. PATENT DOCUMENTS

| 6,262,724 B1 | 7/2001 | Crow et al. |
| 7,209,167 B2 | 4/2007 | Pyle et al. |

(Continued)

FOREIGN PATENT DOCUMENTS

| WO | 2011/098925 A1 | 8/2011 |
| WO | WO2014100893 | 7/2014 |

OTHER PUBLICATIONS

PCT Search Report and Written Opinion dated Sep. 16, 2015 for PCT Application No. PCT/US15/38523, 18 pages.
(Continued)

*Primary Examiner* — Claudia Dragoescu
(74) *Attorney, Agent, or Firm* — Invoke

(57) ABSTRACT

A method of generating a digital media message includes receiving a first digital content segment via an electronic device, associating the first digital content segment with a first position in a play sequence, receiving a second digital content segment different from the first digital content segment, and receiving a third digital content segment different from the first and second digital content segments. The method also includes adding the second and third digital content segments to the play sequence such that the second digital content segment is presented simultaneously with at least one of the first and third digital content segments when the digital media message is played. Such a method further includes providing the digital media message for sharing with a remote electronic device.

19 Claims, 15 Drawing Sheets

Related U.S. Application Data

(60) Provisional application No. 62/042,114, filed on Aug. 26, 2014, provisional application No. 62/038,493, filed on Aug. 18, 2014.

(51) Int. Cl.
  *G06F 3/0484* (2013.01)
  *G06F 3/01* (2006.01)
  *H04L 12/58* (2006.01)

(52) U.S. Cl.
  CPC .......... *G06F 3/04845* (2013.01); *H04L 51/08* (2013.01); *H04L 51/10* (2013.01)

(56) References Cited

U.S. PATENT DOCUMENTS

| | | | |
|---|---|---|---|
| 7,353,282 | B2 | 4/2008 | Nichols et al. |
| D597,101 | S | 7/2009 | Chaudhri et al. |
| D621,849 | S | 8/2010 | Anzures et al. |
| D626,138 | S | 10/2010 | McLaughlin et al. |
| 7,873,911 | B2 | 1/2011 | Gopalakrishnan |
| 8,290,777 | B1 | 10/2012 | Nguyen et al. |
| 8,428,453 | B1 | 4/2013 | Spiegel et al. |
| D701,526 | S | 3/2014 | Poston et al. |
| D701,533 | S | 3/2014 | Jin et al. |
| D704,205 | S | 5/2014 | Greisson et al. |
| 8,737,815 | B2 | 5/2014 | Singer |
| D727,931 | S | 4/2015 | Kim et al. |
| D728,590 | S | 5/2015 | Kim et al. |
| 2003/0063130 | A1 | 4/2003 | Barbieri |
| 2003/0167264 | A1 | 9/2003 | Ogura et al. |
| 2004/0070608 | A1 | 4/2004 | Saka |
| 2004/0075663 | A1 | 4/2004 | Plante |
| 2006/0139340 | A1* | 6/2006 | Geaghan ............... G06F 3/0416 345/177 |
| 2008/0229204 | A1 | 9/2008 | Johnson et al. |
| 2009/0013001 | A1 | 1/2009 | Park et al. |
| 2009/0100068 | A1 | 4/2009 | Gauba et al. |
| 2009/0263044 | A1 | 10/2009 | Imagawa et al. |
| 2009/0327856 | A1 | 12/2009 | Mouilleseaux et al. |
| 2010/0064239 | A1 | 3/2010 | Crawford et al. |
| 2010/0077289 | A1 | 3/2010 | Das et al. |
| 2010/0095240 | A1 | 4/2010 | Shiplacoff et al. |
| 2011/0086616 | A1 | 4/2011 | Brand et al. |
| 2011/0163969 | A1 | 7/2011 | Anzures et al. |
| 2011/0229111 | A1 | 9/2011 | Bonarrigo et al. |
| 2011/0258547 | A1 | 10/2011 | Symons et al. |
| 2011/0264755 | A1 | 10/2011 | Salvatore De Villiers |
| 2012/0005595 | A1 | 1/2012 | Gavade et al. |
| 2012/0066594 | A1* | 3/2012 | Gavade ............... H04N 21/2743 715/716 |
| 2012/0151346 | A1 | 6/2012 | McClements, IV |
| 2012/0284094 | A1 | 11/2012 | de Leon et al. |
| 2012/0308209 | A1 | 12/2012 | Zaletel |
| 2013/0034341 | A1 | 2/2013 | Ichikawa et al. |
| 2013/0055087 | A1 | 2/2013 | Flint |
| 2013/0132904 | A1 | 5/2013 | Primiani et al. |
| 2013/0173727 | A1 | 7/2013 | Libin et al. |
| 2013/0212521 | A1 | 8/2013 | Fedoseyeva et al. |
| 2013/0282514 | A1 | 10/2013 | Dougherty et al. |
| 2013/0294746 | A1 | 11/2013 | Oz et al. |
| 2014/0007257 | A1* | 1/2014 | Dougherty ............. G09B 5/062 726/28 |
| 2014/0055633 | A1 | 2/2014 | Marlin et al. |
| 2014/0100893 | A1 | 4/2014 | Zizzi |
| 2014/0108928 | A1* | 4/2014 | Mumick ............... G06F 3/0488 715/716 |
| 2014/0147095 | A1 | 5/2014 | Oz et al. |
| 2014/0163957 | A1 | 6/2014 | Tesch et al. |
| 2014/0163980 | A1 | 6/2014 | Tesch et al. |
| 2014/0310748 | A1 | 10/2014 | Dureau et al. |
| 2015/0092006 | A1 | 4/2015 | Grossman et al. |
| 2016/0048306 | A1 | 2/2016 | Weil et al. |
| 2016/0048313 | A1 | 2/2016 | Weil et al. |
| 2016/0050172 | A1 | 2/2016 | Weil et al. |

OTHER PUBLICATIONS

PCT Search Report and Written Opinion dated Sep. 29, 2015 for PCT Application No. PCT/US15/38557, 9 pages.

PCT Search Report and Written Opinion dated Sep. 30, 2015 for PCT Application No. PCT/US15/38578, 9 pages.

Wochit, "How it Works: Details on our Video Creation Platform," retrieved Nov. 25, 2015 at <<https://www.wochit.com/how-it-works/>>, Wochit Inc., 2015.

Nguyen, N., "Stop, Collaborate, and Remix: Meet MixBit, an Mobile Video Editor", retrieved on Apr. 8, 2016 at <<http://www.popsugar.com/tech/MixBit-Video-App-31107598>>, 2016, 5 pages.

Office action for U.S. Appl. No. 29/523,571, dated Apr. 22, 2016, Weil et al., "A Display Screen or Portion Thereof Having a Graphical User Interface", 7 pages.

"Video Editor 8.1 brings video editing with awesome video effects to windows phone", retrieved on Apr. 8, 2016 at <<http://mspoweruser.com/video-editor-8-1-brings-video-editing-with-awe-some-video-effects-to-windows-phone/>>, 2016, 2 pages.

Pizano et al., "Integrated multimedia messaging concepts and applications", Proceedings of the 1996 ACM symposium on Applied Computing SAC '96, 1996, pp. 12-16.

Decneut et al., "Targeting heterogeneous multimedia environments with Web services", Proceedings of IEEE International Conference on Web Services, 2004, pp. 682-689.

* cited by examiner

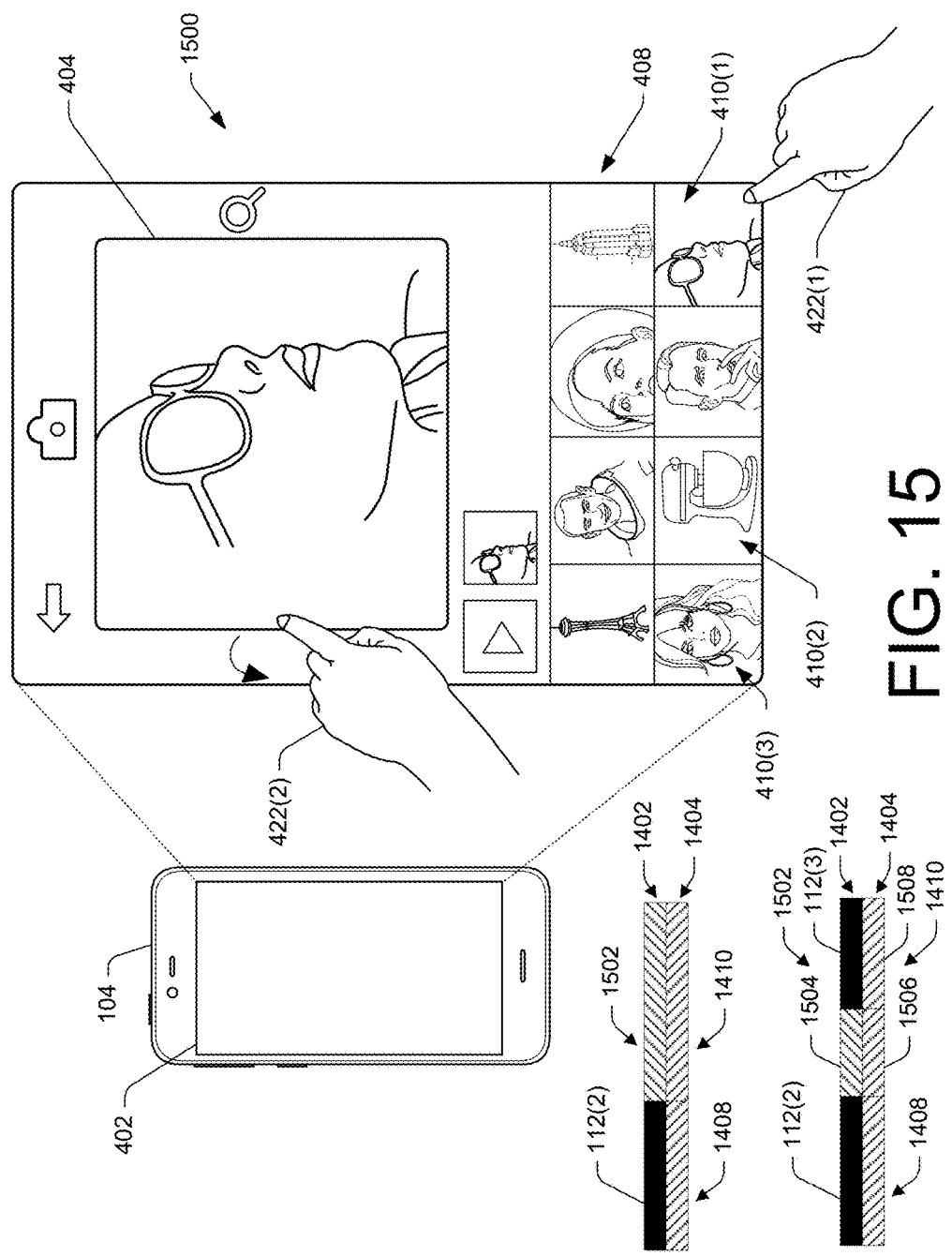

DIGITAL MEDIA MESSAGE GENERATION

CROSS-REFERENCE TO RELATED APPLICATIONS

This application is a continuation-in-part of U.S. patent application Ser. No. 14/569,169, filed Dec. 12, 2014, which claims the benefit of U.S. Provisional Application No. 62/042,114, filed Aug. 26, 2014, and U.S. Provisional Application No. 62/038,493, filed Aug. 18, 2014. The entire disclosures of each of the above applications are incorporated herein by reference.

BACKGROUND

It is common for users of electronic devices to communicate with other remote users by voice, email, text messaging instant messaging, and the like. While these means of electronic communication may be convenient in various situations, such means are only suited for transferring a limited amount of rich content between users. For instance, while text messages and email may be used to transmit written dialogue between users, and audio, video, web content, or other files may be transmitted with the text or email messages as attachments, such files are not integrated with the various components of the text or email message in any way.

As a result of these shortcomings, electronic device messaging applications have been developed to assist the user in creating digital messages that include, for example, images, audio, or other content. However, the functionality of existing messaging applications is limited. For example, such applications generally do not enable the user to combine a wide array of digital content segments (e.g., an audio segment and a digital image) such that two or more content segments, such as segments from different sources, can be presented to the recipient simultaneously as an integrated component of the digital message. Additionally, such applications do not generally provide the user with the ability to easily edit the digital message during creation. Further, while a variety of different audio and/or video editing software is available, such software may be far too cumbersome for use on mobile phones or other like electronic devices. Such video editing software is also complicated and time consuming, and is typically not suitable for use in creating digital messages as a means of communication between electronic device users.

For example, in order to enable conversational communication between users, the digital messages must be created within a relatively narrow creation window (i.e., a relatively high speed of creation). In some situations, a one-minute creation window may be at the high end of the spectrum. However, existing audio and/or video editing software that enables combining such media into single shareable file operate at a "project building" pace, often requiring dozens of steps and falling outside of the narrow creation window (i.e., a relatively low speed of creation) that typical conversational communication requires. As a result, electronic device messaging applications have defaulted to only sharing media items as disparate elements "attached to" but not integrated or woven into the digital message.

Example embodiments of the present disclosure are directed toward curing one or more of the deficiencies described above.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 15 shows another illustrative user interface screen displayed on an electronic device, as well as example audio and video tracks.

DETAILED DESCRIPTION

Overview

Figure 1:
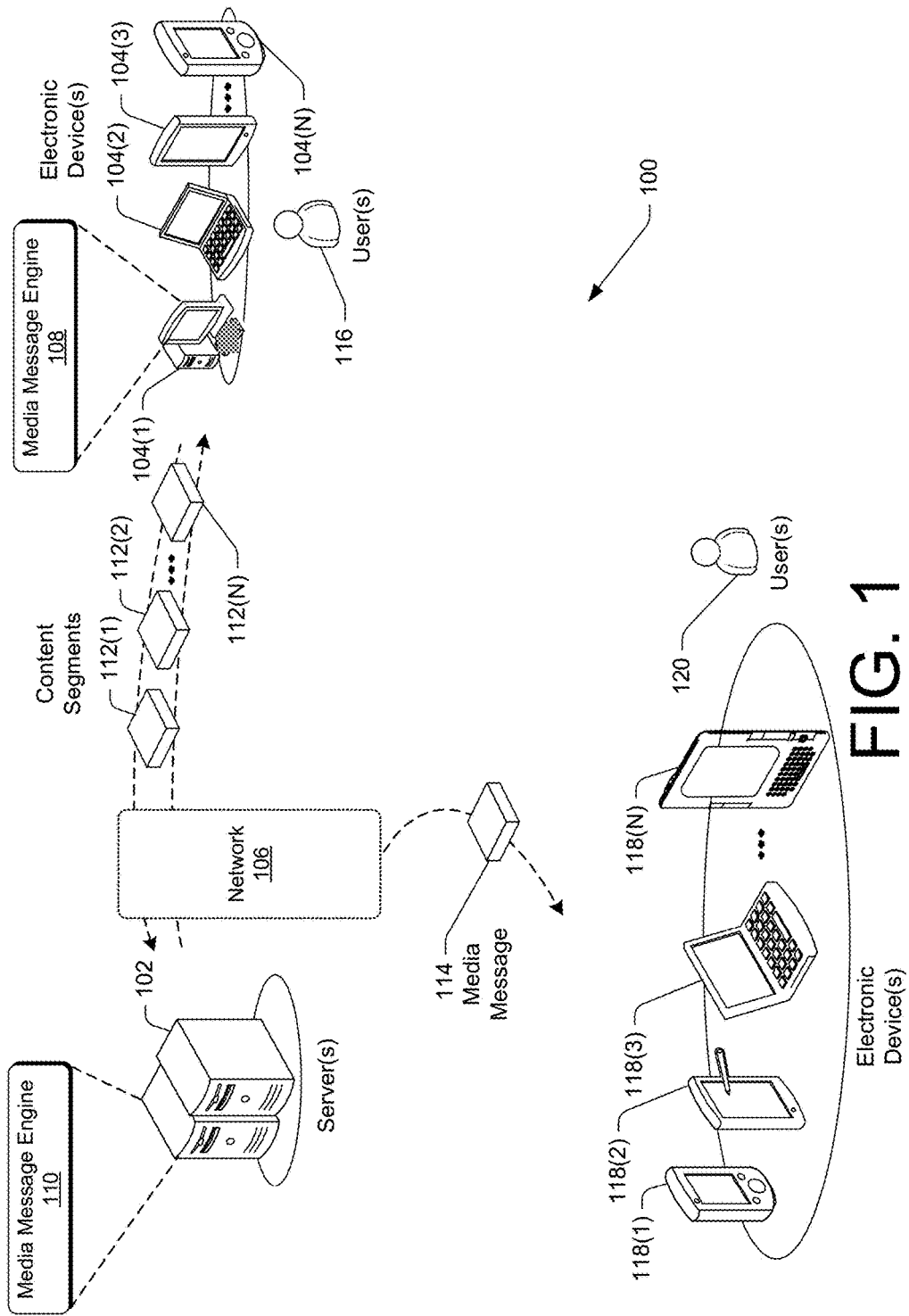
FIG. 1 is a schematic diagram of an illustrative computing environment for implementing various embodiments of digital media message generation.

The disclosure is directed to devices and techniques for generating digital media messages that can be easily shared between users of electronic devices as a means of communication. The techniques described herein enable users to combine a variety of different digital content segments into a single digital media message. For example, the user may create a digital media message by capturing audio content segments, video content segments, digital images, web content, and the like. Such content segments may be captured by the user during generation of the digital media message. Alternatively, such content segments may be captured by the user prior to generating the digital media message and may be saved in a memory of the electronic device for incorporation into the digital media message at a later time. As part of generating the digital media message, the user may select one or more of the digital content segments for incorporation into the message and may associate the selected content segments with respective positions in a play sequence of the digital media message. Additionally, the user may select two or more of the digital content segments to be presented simultaneously when the digital media message is played by a recipient of the digital media message on a remote device. The user may also edit or revise the digital content segments or various other portions of the digital media message while the message is being generated.

In various embodiments, the devices and techniques described herein may enable users of electronic devices to communicate by transmitting digital media messages that include a rich, unique, and artful combination of digital content segments. Such content segments may be combined in response to, for example, a series of simple touch gestures received from a user of the electronic device. For example, during generation of a digital media message at least part of a video track of an underlying digital video segment of a first digital content segment may be replaced with a digital image or other second digital content segment. In such examples, a combined segment may be formed by replacing a part of a first digital content segment with a second digital content segment. Methods of generating such digital media messages may be far simpler and less time consuming than using, for example, known audio and/or video editing software. Additionally, methods of generating such digital media messages may enable users to combine and present multiple digital content segments in ways that are not possible using existing messaging applications. Example methods of the present disclosure may also enable the user to edit or revise such digital media messages during creation with relative ease and simplicity.

In addition, replacing, for example, part of a video track of an underlying digital video segment with a digital image may reduce the file size of the digital video segment and/or of a combined segment formed by combining the digital image with the digital video segment. In particular, the replaced portion of the video track typically may typically be rendered at approximately 300 frames/second for a duration of the portion of the video track, and may be characterized by a commensurate memory and/or file size (e.g., in bytes). The selected digital image, on the other hand, may comprise a single frame that may be rendered for the duration of the replaced portion of the video track. Thus, replacing a portion of the video track of the underlying digital video segment with the digital image may reduce the number of frames/second of the underlying video segment, thereby reducing file size thereof. As a result, a digital media message generated using such techniques may have a smaller file size and may require/take up less memory than a corresponding digital media message generated using the underlying digital video segment with the video track unchanged (e.g., without replacing a portion of the video track with a selected digital image).

Reducing the file size and/or memory requirements of digital media messages in this way has many technical effects and/or advantages. For example, such a reduction in file size and/or memory requirements will enable the various networks, servers, and/or electronic devices described herein to transfer such digital media messages more quickly and with fewer network, server, and/or device resources. As a result, such a reduction in file size and/or memory requirements will reduce overall network load/traffic, and will improve network, server, and/or electronic device performance. As another example, such a reduction in file size and/or memory requirements will enable the various networks, servers, and/or electronic devices described herein to provide, render, display, and/or otherwise process such digital media messages more quickly and with fewer network, server, and/or device resources. In particular, such a reduced file size may reduce the server and/or electronic device memory required to receive and/or store such messages. Such a reduced file size may also reduce the processor load required to provide, render, display, and/or otherwise process such digital media messages. As a result, such a reduction in file size and/or memory requirements will reduce overall network load/traffic, and will improve network, server, and/or electronic device performance and efficiency.

Illustrative environments, devices, and techniques for generating digital media messages are described below. However, the described message generation techniques may be implemented in other environments and by other devices or techniques, and this disclosure should not interpreted as being limited to the example environments, devices, and techniques described herein.

Illustrative Architecture

FIG. 1 is a schematic diagram of an illustrative computing environment 100 for implementing various embodiments of digital media message generation. The computing environment 100 may include server(s) 102 and one or more electronic devices 104(1)-104(N) (collectively "electronic devices 104") that are communicatively connected by a network 106. The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network such as the Internet, other distribution techniques may be implemented that transmit information via memory cards, flash memory, or other portable memory devices.

A media message engine 108 on the electronic devices 104 and/or a media message engine 110 on the server(s) 102 may receive one or more digital content segments 112(1)-112(N) (collectively, "digital content segments 112" or "content segments 112") and may generate one or more digital media messages 114 (or "media messages 114") based on the content segments 112. In example embodiments, the media message engine 108 may receive one or more content segments 112 via interaction of a user 116 with an electronic device 104. In some embodiments, the media message engine 108 may provide such content segments 112 to the media message engine 110 on the server 102, via the network 106, to generate at least a portion of the media message 114. Alternatively, at least a portion of the media message 114 may be generated by the media message engine 108 of the respective electronic device 108. In either example, the media message 114 may be directed to one or more additional electronic devices 118(1)-118(N) (collectively "electronic devices 118") via the network 106. Such electronic devices 118 may be disposed at a location remote from the electronic devices 104, and one or more users 120 may consume the digital media message 114 via one or more of the electronic devices 118.

Each of the electronic devices 104 may include a display component, a digital camera, and an audio input and transmission component. Such audio input and transmission components may include one or more microphones. The electronic devices 104 may also include hardware and/or software that support voice over Internet Protocol (VoIP) as well as any of the display, input, and/or output components described herein. Each of the electronic devices 104 may further include a web browser that enables the user 116 to navigate to a web page via the network 106. In some embodiments, the user 116 may generate and/or capture one or more digital content segments 112 using, for example, the camera and the microphone. For example, the user 116 may capture one or more digital images using the camera and/or may capture one or more video clips using the camera in conjunction with the microphone. Additionally, each web page may present content that the user 116 may capture via the electronic device 104, using various copy and/or save commands included in the web browser of the electronic device 104, and the user may incorporate such content into one or more content segments 112. Any of the content segments 112 described herein may be provided to one or both of the media message engines 108, 110, and the media message engines 108, 110 may incorporate such content segments 112 into the media message 114.

Upon receiving the content segments 112 described herein, the media message engines 108, 110 may tag the respective content segments 112 with associated metadata. The associated metadata may include profile information about the type of content (e.g., image, video, audio, text, animation, etc.), the source of the content segment 112 (e.g., camera, microphone, internet web page, etc.), and/or a position in a play sequence of the digital media message 114 with which the content segment 112 is to be associated.

The media message engines 108, 110 described herein may integrate and/or otherwise combine two or more digital content segments 112 to form the digital media message 114. In some examples, the digital content segments 112 may be presented to the user sequentially when the media message 114 is played. Alternatively, the media message engines 108, 110 may combine two or more digital content segments 112 such that the combined digital content segments 112 are presented simultaneously when the media message 114 is played. The media message engines 108, 110 may also distribute the finalized media message 114 to one or more of the electronic devices 118. Various example components and functionality of the media message engines 108, 110 will be described in greater detail below with respect to, for example, FIGS. 2 and 3.

In various embodiments, the electronic devices 104, 118 may include a mobile phone a portable computer, a tablet computer, an electronic book reader device (an "eBook reader device"), or other devices. Each of the electronic devices 104, 118 may have software and hardware components that enable the display of digital content segments 112, either separately or combined, as well as the various digital media messages 114 described herein. The electronic devices 104, 118 noted above are merely examples, and other electronic devices that are equipped with network communication components, data processing components, electronic displays for displaying data, and audio output capabilities may also be employed.

Example Server

Figure 2:
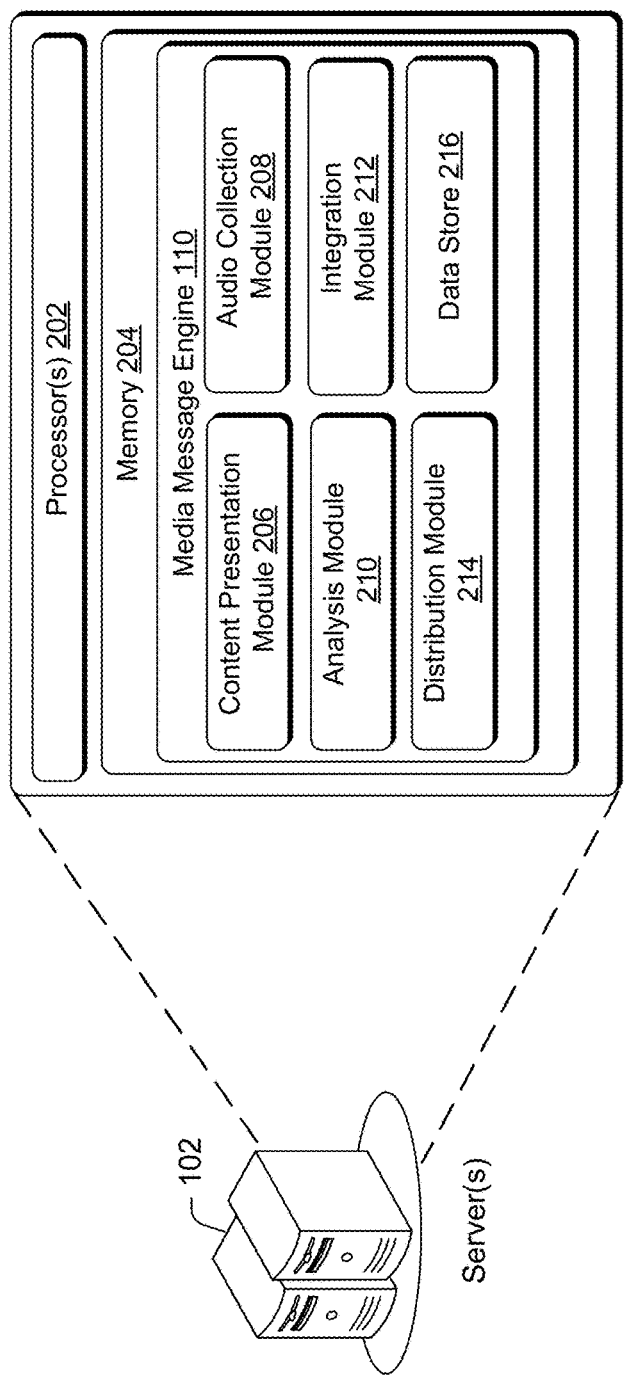
FIG. 2 is a schematic diagram of illustrative components in an example server that may be used in an example digital media message generation environment.

FIG. 2 is a schematic diagram of illustrative components in example server(s) 102 of the present disclosure. The server(s) 102 may include one or more processor(s) 202 and memory 204. The memory 204 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The media message engine 110 may be a hardware or a software component of the server(s) 102 and in some embodiments, the media message engine 110 may comprise a component of the memory 204. As shown in FIG. 2, in some embodiments the media message engine 110 may include one or more of a content presentation module 206, a segment collection module 208, an analysis module 210, an integration module 212, and a distribution module 214. The modules may include routines, programs instructions, objects, and/or data structures that perform particular tasks or implement particular abstract data types. The server(s) 102 may also implement a data store 216 that stores data, digital content segments 112, and/or other information or content used by the media message engine 110.

The content presentation module 206 may enable a human reader to select digital content segments 112 for the purpose of including the selected digital content segments 112 in a digital media message 114. In various embodiments, the content presentation module 206 may present a web page to a user 116 of an electronic device 104, such as via the network 106. In further embodiments, the content presentation module 206 may present digital content, information, and/or one or more digital content segments 112 to the user 116 of an electronic device 104 via the network 106. The content presentation module 206 may also enable the user 116 to select content, information, and/or one or more digital content segments 112. Once the user 116 has selected, for example, a digital content segment 112, the content presentation module 206 may present further content, information, and/or digital content segments 112 to the user 116. The content presentation module 206 may also tag the selected digital content segment 112 for inclusion in the digital media message 114.

The segment collection module 208 may collect audio recordings, video recordings, images, files, web content, audio files, video files, web addresses, and/or other digital content segments 112 identified, selected, and/or captured by the user 116. Additionally, the segment collection module 208 may label each digital content segment 112 with metadata. The metadata may include profile information about the type of content (e.g., image, video, audio, text, animation, etc.), the source of the content segment 112 (e.g., camera, microphone, internet web page, etc.), and/or a position in a play sequence of the digital media message 114 with which the content segment 112 is to be associated. For example, the metadata for an audio recording may include identification information identifying the digital content segment 112 as comprising an audio recording, information indicating that the digital content segment 112 was captured using a microphone of an electronic device 104, information indicating the date and time of recordation, the length of the recording, and/or other information. Such metadata may be provided to the content presentation module 206 by the segment collection module 208 or alternatively, such metadata may be provided to the segment collection module 208 by the content presentation module 206.

The analysis module 210 may be used by the segment collection module 208 to determine whether a collected content segment 112 meets certain quality criteria. In various embodiments, the quality criteria may include whether a background noise level in the content segment 112 is below a maximum noise level, whether video and/or image quality in the content segment 112 is above a minimum pixel or other like quality threshold, and so forth.

The integration module 212 may use at least a portion of the metadata described above to assess and/or otherwise determine which content segment 112 to select for integration into the digital media message 114. Additionally or alternatively, the integration module 212 may use results received from the analysis module 210 to make one or more such determinations. Such determinations may be provided to the user 116 of the electronic device 104 while a digital media message 114 is being generated as a way of guiding the user with regard to the combination of one or more content segments 112. For instance, the integration module 212 may provide advice, suggestions, or recommendations to the user 116 as to which content segment 112 to select for integration into the digital media message 114 based on one or more of the factors described above.

The distribution module 214 may facilitate presentation of the digital media message 114 to one or more users 120 of the electronic devices 118. For example, once completed, the distribution module 214 may direct the digital media message 114 to one or more of the electronic devices 118 via the network 106. Additionally or alternatively, the distribution module 214 may be configured to direct one or more digital content segments 112 between the servers 102 and one or more of the electronic devices 104. In such embodiments, the distribution module 214 may comprise one or more kernels, drivers, or other like components configured to provide communication between the servers 102 and one or more of the electronic devices 104, 118.

The data store 216 may store any of the metadata, content, information, or other data utilized in creating one or more content segments 112 and/or digital media messages 114. For example, the data store 216 may store any of the images, video files, audio files, web links, media, or other content that is captured or otherwise received via the electronic device 104. Such content may be, for example, provided to the data store 216 via the network during creation of a content segment 112 and/or a digital media message 114. Alternatively, such content may be provided to the data store 216 prior to generating a content segment 112 and/or a digital media message 114. In such examples, such content may be obtained and/or received from the data store 216 during generation of a content segment 112 and/or a digital media message 114.

In example embodiments, one or more modules of the media message engine 110 described above may be combined or omitted. Additionally, one or more modules of the media message engine 110 may also be included in the media message engine 108 of the electronic device 104. As a result, the example methods and techniques of the present disclosure, such as methods of generating a digital media message, may be performed solely on either the server 102 or one of the electronic devices 104. Alternatively, in further embodiments, methods and techniques of the present disclosure may be performed, at least in part, on both the server 102 and one of the electronic devices 104.

Example Electronic Device

Figure 3:
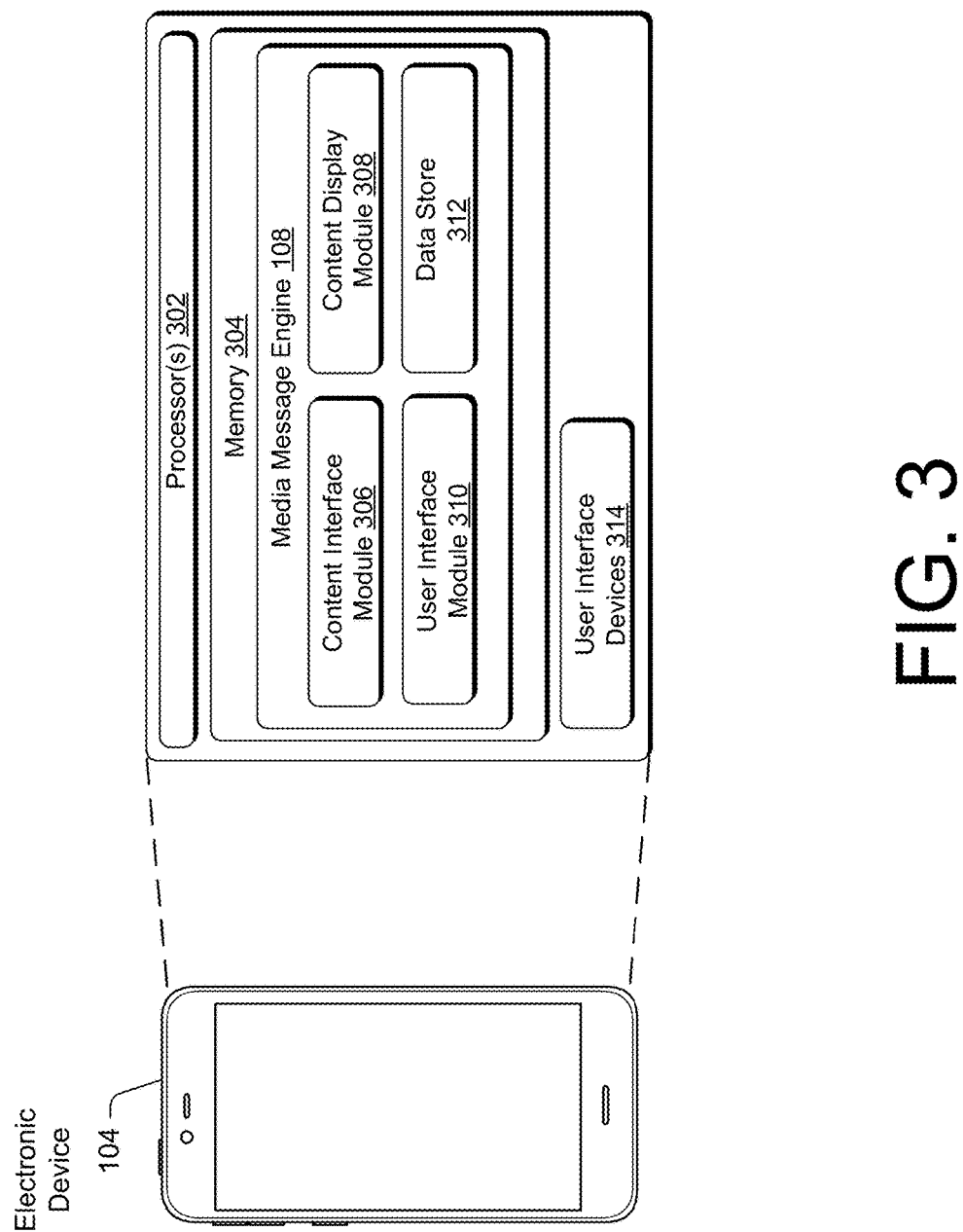
FIG. 3 is a schematic diagram of illustrative components in an example electronic device that may be used in an example digital media message generation environment.

FIG. 3 is a schematic diagram of illustrative components in an example electronic device 104 that is used to prepare and/or consume digital content segments 112 and digital media messages 114. As noted above, the electronic device 104 shown in FIG. 3 may include one or more of the components described above with respect to the server 102 such that digital content segments 112 and/or digital media messages 114 may be created and/or consumed solely on the electronic device 104. Additionally and/or alternatively, the electronic device 104 may include one or more processor(s) 302 and memory 304. The memory 304 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as a carrier wave, or other transmission mechanisms.

Similar to the memory 204 of the server 102, the memory 304 of the electronic device 104 may also include a media message engine 110, and the engine 110 may include any of the modules or other components described above with respect to the media message engine 108. Additionally or alternatively, the media message engine 110 of the electronic device 104 may include one or more of a content interface module 306, a content display module 308, a user interface module 310, and a data store 312 similar to the data store 216 described above. The modules may include routines, programs, instructions, objects, and/or data structures that perform particular tasks or implement particular abstract data types. The electronic device 104 may also include one or more cameras, microphones, displays (e.g., a touch screen display), keyboards, mice, touch pads, proximity sensors, capacitance sensors, or other user interface devices 314.

The content interface module 306 may enable the user to request and download content, digital content segments 112, or other information from the server(s) 102 and/or from the internet. The content interface module 306 may download such content via any wireless or wired communication interfaces, such as Universal Serial Bus (USB), Ethernet, Bluetooth®, Wi-Fi, and/or the like. Additionally, the content interface module 306 may include and/or enable one or more search engines or other applications on the electronic device 104 to enable the user 116 to search for images, video, audio, and/or other content to be included in a digital media message 114.

The content display module 308 may present content, digital content segments 112, digital media messages 114, or other information on a display of the electronic device 104 for viewing. In various embodiments, the content display module 308 may provide functionalities that enable the user 116 to manipulate individual digital content segments 112 or other information as a digital media message 114 is being generated. For example, the content display module 308 may provide editing functionality enabling the user 116 to delete, move, modify, augment, cut, paste, copy, save, or otherwise alter portions of each digital content segment 112 as part of generating a digital media message 114.

Example User Interfaces

Figure 4:
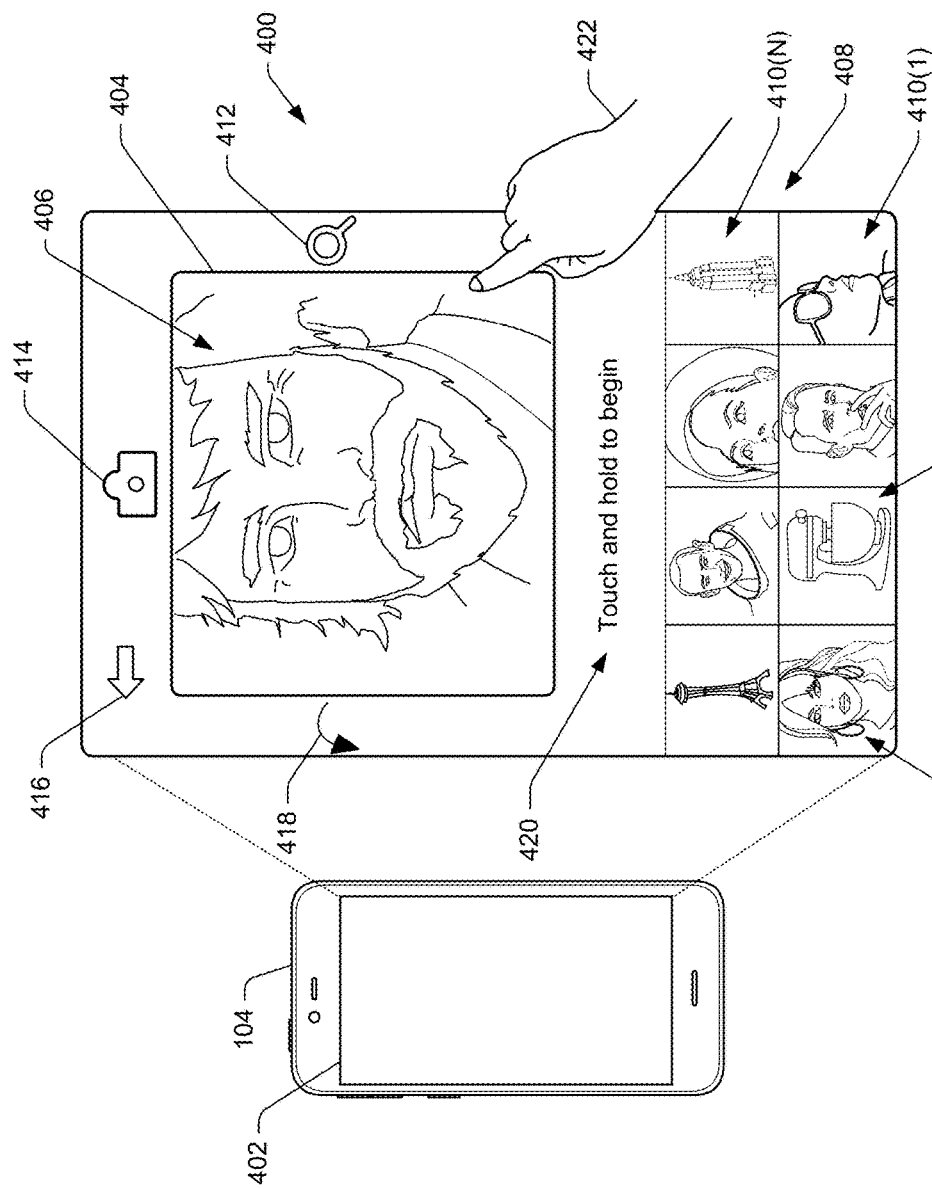
FIG. 4 shows an illustrative user interface screen displayed on an electronic device that enables users to generate a portion of an example digital media message.

FIG. 4 shows an illustrative user interface 400 that enables the user 116 to generate a digital media message 114. For example, the user interface 400 may be displayed on an electronic device 104 that enables users to create, capture, search for, and/or select digital content segments 112, and to generate and/or consume digital media messages 114. The user interface 400 may be displayed, for example, on a display 402 of the electronic device 104. In some examples, the user interface 400 may be a web page that is presented to the user 116 via a web browser on the electronic device 104. Alternatively, the user interface 400 may be an interface generated and provided by the content display module 308 as part of a digital media message generation application operating locally on the electronic device 104. For the duration of this disclosure, example embodiments in which the user interface 400 is generated and provided by the content display module 308 and/or the message generation engine 108 as part of a digital media message generation application operating locally on the electronic device 104 will be described unless otherwise noted.

As shown, the message generation engine 108 may present a user interface 400 that includes a first portion 404 displaying an image 406, and a second portion 408 that includes one or more thumbnails 410(1)-410(N) (collectively "thumbnails 410"). In example embodiments, the image 406 displayed in the first portion 404 may be one or more images, photos, or first frames of a video stored in the memory 304 of the electronic device 104. Alternatively, the content display module 308 may present one or more images 406 in the first portion 404 that are obtained in real time via, for example, a camera or other user interface device 314 of the electronic device 104. For example, the first portion 404 may provide an image 406 of objects that are within a field of view of the camera, and at least the first portion 404 may be receptive to user input such as, for example, touch input.

As will be described in greater detail below, the message generation engine 108 may receive input from a user of the electronic device 104 via either the first portion 404 or the second portion 408. In some embodiments, such input may comprise one or more gestures such as a touch and hold command within the first portion 404. Receipt of such an input in the first portion 404 may cause the message generation engine 108 to capture and/or otherwise receive a first digital content segment 112 via, for example, the camera or other user interface device 314 of the electronic device 104. In such embodiments, the received digital content segment 112 may be displayed within the first portion 404 as the content segment 112 is being recorded and/or otherwise captured by the camera. The message generation engine 108 may associate the digital content segment 112 with a desired position in a play sequence of a digital media message 114.

Additionally and/or alternatively, the message generation engine 108 may receive input from the user of the electronic device 104 that includes a touch and hold command on one or more of the thumbnails 410 provided in the second portion 408. Receipt of such an input in the second portion 408 may cause the message generation engine 108 to receive a video segment and/or an image associated with the respective thumbnail 410 for inclusion in the digital media message 114. The message generation engine 108 may also associate digital content segments 112 receives by selection of one or more of the thumbnails 410 with the respective desired position in the play sequence of the digital media message 114.

In example embodiments, each of the thumbnails 410 may be representative and/or otherwise indicative of a respective photo, image, and/or video stored in the memory 304. For example, such content may have been captured by a user 116 of the electronic device 104 prior to commencing generation of the digital media message 114. Alternatively, one or more photos, images, videos, and/or other content corresponding to one or more of the thumbnails 410 may be captured during generation of the digital media message 114. Thus, in some embodiments, the second portion 408 may comprise a scrollable thumbnail library including respective thumbnails 410 that may be selected by the user 116 for inclusion in the digital media message 114.

As shown in FIG. 4, the user interface 400 may also include one or more controls configured to assist the user 116 in capturing one or more digital content segments 112, modifying one or more of the digital content segments, and/or generating one or more digital media messages 114. For example, the user interface 400 may include a zoom control 412 configured to enlarge or reduce, for example, the size of the image 406 shown in the first portion 404 and/or to enlarge or reduce the size of the first portion 404 itself. The user interface 400 may also include a user interface device control 414 configured to control one or more operations of a user interface devices 314 of the electronic device 104. For example, the user interface device control 414 may be configured to control activation of one or more cameras of the device 104. In particular, the user interface device control 414 may be configured to select and/or toggle between a first camera of the electronic device 14 on a first side of the electronic device 104 and a second camera on a second side of the electronic device 104 opposite the first side.

The user interface 400 may also include a plurality of additional controls including one or more navigation controls 416 and/or one or more editing controls 418. For example, the user interface 400 may include a navigation control 416 that, upon selection thereof by the user 116, may enable the user to browse backward or forward between different user interfaces 400 while generating a digital media message 114. For example, a first navigation control 416 may comprise a "back" control while a second navigation control 416 may comprise a "forward" control.

Additionally, one or more of the editing controls 418 may enable a user 116 to add, remove, cut, paste, draw, rotate, flip, shade, color, fade, darken, and/or otherwise modify various aspects of the digital media message 114 and/or various digital content segments 112. For example, one or more of the editing controls 418 may comprise an "undo" control that enables the user 116 to delete and/or otherwise remove one or more digital content segments 112 from a play sequence of the digital media message 114. Although a variety of different controls have been described above with regard to the user interface 400, it is understood that in further example embodiments one or more additional controls may be presented to the user 116 by the media message engine 108. For example, such editing controls 418 may further comprise any audio, video, image, or other editing tools known in the art. In some examples, at least one of the controls described herein may be configured to modify a first digital content segment 112 before a second, third, or other additional digital content segment 112 is received by the media message engine 108.

The user interface 400 may also include a message bar 420 configured to provide guidance to the user 116 before, during, and/or after generation of the digital media message 114. For example, the message bar 420 may provide instructions to the user 116 and/or other guidance related to use of one or more of the controls described above, next steps to be taken in order to generate the digital media message 114, the completion status of the digital media message 114, and/or other information. As shown in FIG. 4, in example embodiments the message bar 420 may be disposed between the first portion 404 and the second portion 408. Alternatively, in further example embodiments the message bar 420 may be disposed above the first portion 404, below the second portion 408, and/or at any other position on the user interface 400. In an example embodiment, the message bar 420 may instruct the user 116 to touch and hold, for example, the first portion 404 or the second portion 408 in order to begin generating a digital media message 114.

Figure 5:
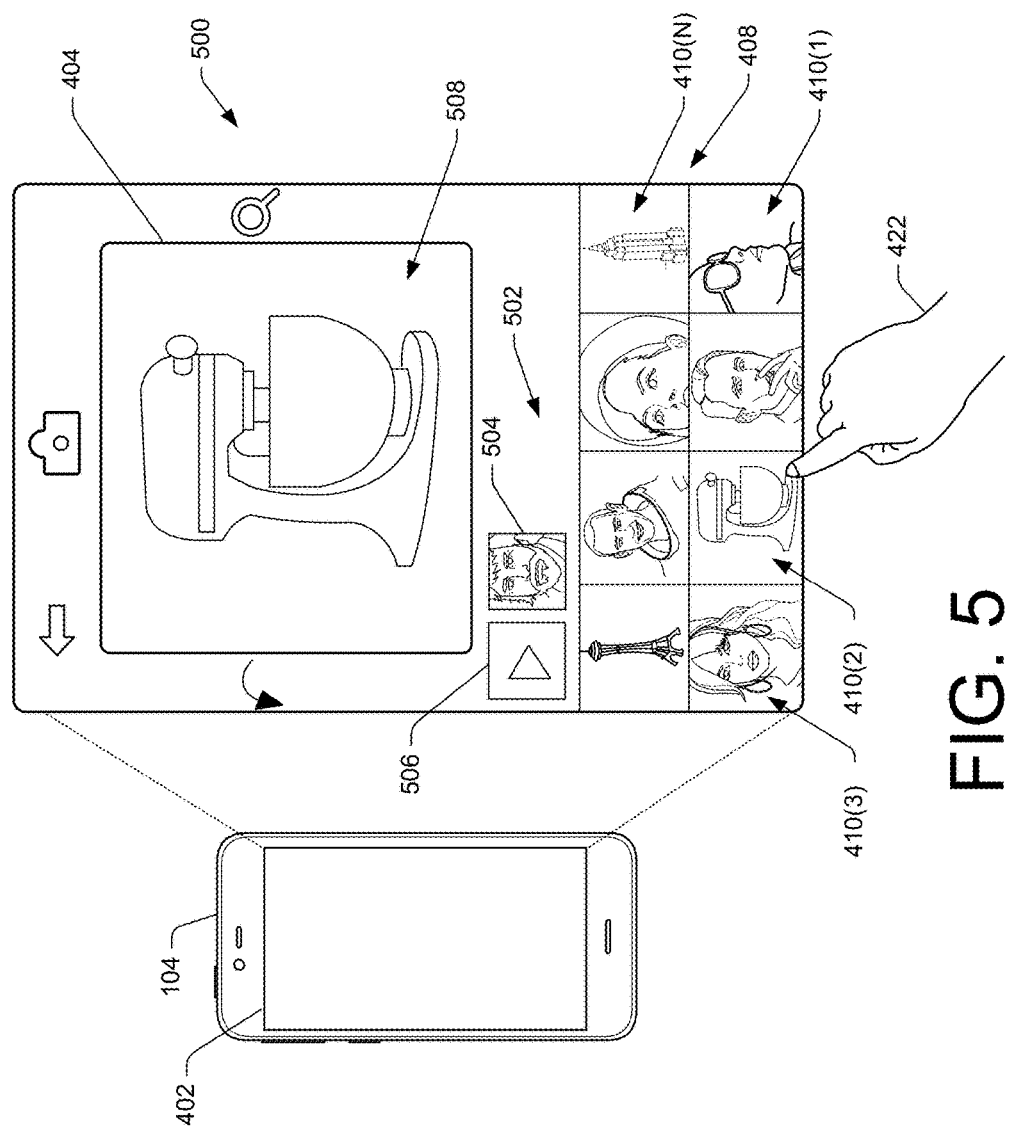
FIG. 5 shows another illustrative user interface screen displayed on an electronic device that enables users to generate a portion of an example digital media message.

FIG. 5 illustrates another example user interface 500 of the present disclosure. In example embodiments, the media message engine 108 may provide such an example user interface 500 during the process of generating a digital media message 114 and, for example, after at least one digital content segment 112 has been received by the media message engine 108 via the electronic device 104. For example, the user interface 500 may include visual indicia of a play sequence 502 associated with the digital media message 114 that is currently being generated. Such visual indicia may include a first portion corresponding to a first digital content segment 112 received by the media message engine 108, and at least one additional portion corresponding to a respective additional digital content segment 112 received by the media message engine 108.

In some examples, the visual indicia of the play sequence 502 may include one or more thumbnails 504 illustrating and/or otherwise indicative of respective digital content segments 112 that have previously been added to and/or otherwise associated with the digital media message 114. In example embodiments, the visual indicia of the play sequence 502 may include various thumbnails 504 provided in the sequential order in which each respective content segment 112 has been received by the media message engine 108. For example, digital content segments 112 received earlier in time during the generation of a digital media message 114 may be represented by respective thumbnails 504 disposed further to the left-hand side of the display 402 than additional thumbnails 504 representing respective digital content segments 112 received relatively later in time. Further, in example embodiments each respective thumbnail 504 may illustrate one or more scenes from a video, a representation of a photo or image, and/or any other visual representation of the respective digital content segment 112 to which the thumbnail 504 corresponds. In this way, the thumbnails 504 provided as part of the visual indicia of the play sequence 502 may assist the user 116 in recalling the content and/or general flow of the digital media message 114 during creation thereof. The example thumbnail 504 illustrated in FIG. 5 is representative of, for example, the image 406 described above with respect to FIG. 4. In such an example, a video, photo, image, or other such content associated with a digital content segment 112 received via the user interface 400 of FIG. 4 may, for example, be associated with a first position in the play sequence associated with the user interface 500 of FIG. 5.

The user interface 500 may also include one or more controls associated with the visual indicia of the play sequence 502. For example, such controls may include a play control 506. In example embodiments, the play control 506 may be configured to play, display, and/or otherwise provide a preview of the digital media message 114 to the user via, for example, the first portion 404 of the display 402. In such embodiments, the media message engine 108 may play one or more portions of the digital media message 114 currently being generated in response to receiving a touch input and/or other input via the play control 506. In some embodiments, further functionality may be provided to the user 116 via the play control 506 and/or via one or more additional controls associated with the play control 506.

For example, the play control 506 and/or other associated controls may enable the user 116 to increase or decrease the speed at which the preview of the digital media message 114 is provided. The play control 506 and/or other associated controls may also enable the user 116 to skip between multiple digital content segments 112 associated with the corresponding play sequence. Additionally, the play control 506 and/or other associated controls may enable the user 116 to pause the preview of the digital media message 114. In examples in which such functionality is provided via the play control 506, such functionality may be accessed via multiple taps, multiple touches, or other gestures such as swipe gestures, and the like received via the first portion 404. Alternatively, in examples in which such functionality is provided via one or more additional play controls, such additional play controls may be rendered, displayed, and/or otherwise provided via the display 402 at a location, for example, proximate the play control 506.

As shown in FIG. 5, in some examples the media message engine 108 may provide an image 508 to the user 116 via the first portion 404. In such examples, the image 508 may correspond to one or more of the thumbnails 410 shown in the second portion 408. For example, in some embodiments the user 116 may select a thumbnail 410 of the second portion 408 by touching and/or holding the desired thumbnail 410 with the hand 422 of the user 116. When such a thumbnail 410 is selected in this way, an image 508 corresponding to the selected thumbnail 410 may be displayed in the first portion 404. For example, the media message engine 108 may receive at least one digital content segment 112 in response to selection of one or more such thumbnails 410 by the user 116. In example embodiments, when one or more of the thumbnails 410 is selected in this way, the media message engine 108 may not only receive a first digital content segment 112 comprising a photo, video, image, and/or other content corresponding to the selected thumbnail 410, but may also receive a different additional content segment 112 while the surface and/or portion of the display 402 corresponding to the thumbnail 410 is contacted by the hand 422 of the user 116.

For example, in such embodiments the additional digital content segment 112 may comprise audio or other like input captured by a microphone or other user interface device 314 of the electronic device 104 while the surface and/or portion of the display 402 corresponding to the thumbnail 410 is contacted by the hand 422 of the user 116. In such embodiments, both of the respective digital content segments may be added to the play sequence of the digital media message 114 such that the respective digital content segments 112 are presented simultaneously when the digital media message 114 is played. As shown in FIG. 5, the image 508 may correspond to the thumbnail 410(2) currently being contacted by the hand 422 of the user 116.

Figure 6:
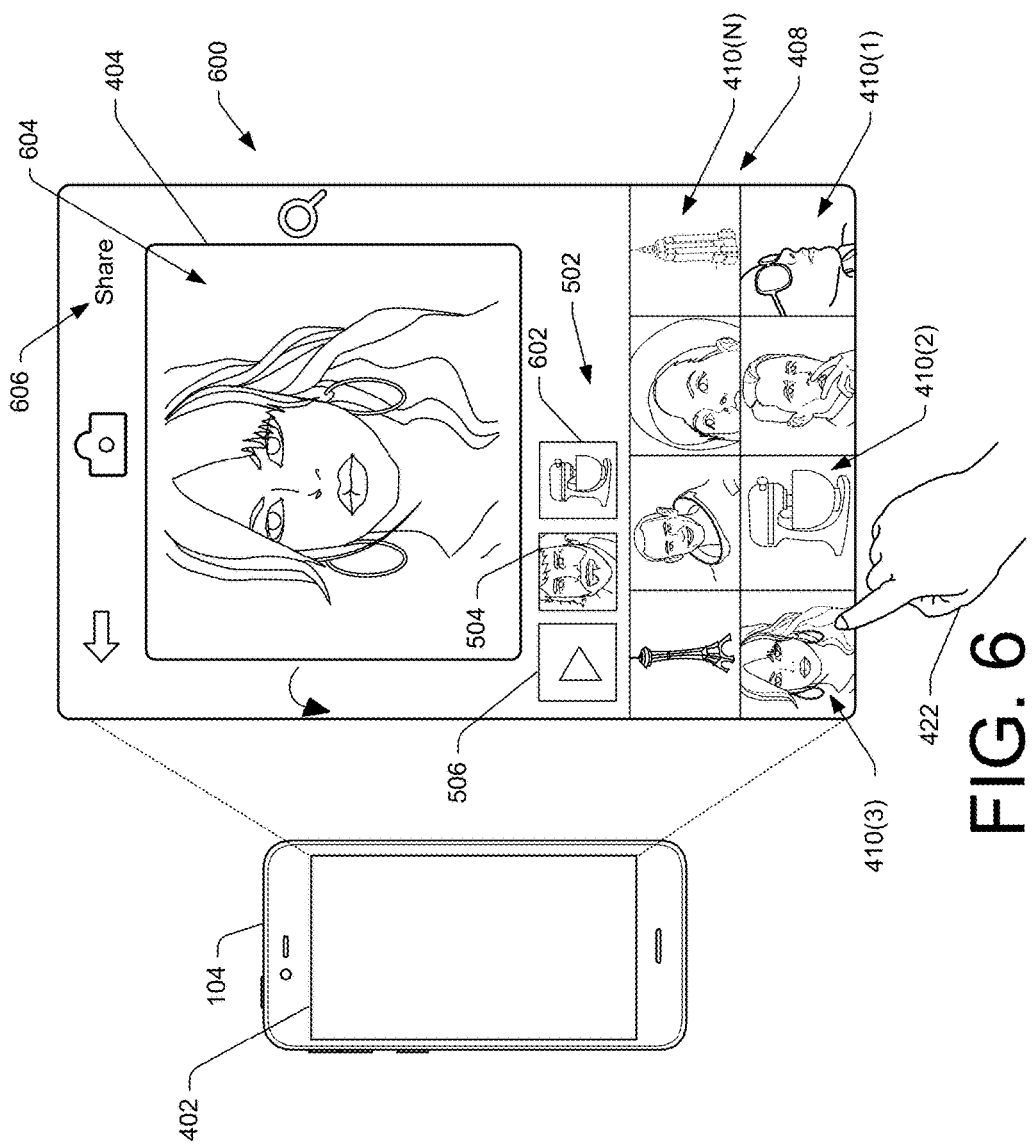
FIG. 6 shows still another illustrative user interface screen displayed on an electronic device that enables users to generate a portion of an example digital media message.

FIG. 6 illustrates a further user interface 600 provided by the media message engine 108. In example embodiments, the media message engine 108 may provide such an example user interface 600 during the process of generating a digital media message 114 and, for example, after a plurality of digital content segments 112 have been received by the media message engine 108 via the electronic device 104. For example, the user interface 600 may include visual indicia of the play sequence 502 that includes the thumbnail 504 described above with respect to FIG. 5, as well as a thumbnail 602 illustrating and/or otherwise indicative of a digital content segment 112 associated with the image 508 described above with respect to FIG. 5.

As noted above, the various thumbnails 504, 602 included in the visual indicia of the play sequence 502 may be provided in the sequential order in which each respective content segment 112 has been received by the media message engine 108. For example, the thumbnail 504 is disposed further to the left-hand side of the display 402 than the thumbnail 602, thereby indicating that a digital content segments 112 corresponding to the thumbnail 504 was received earlier in time than a digital content segment 112 corresponding to the thumbnail 602.

As shown in FIG. 6, in some examples the media message engine 108 may provide an image 604 to the user 116 via the first portion 404. In such examples, the image 604 may correspond to one or more of the thumbnails 410 shown in the second portion 408. For example, in the embodiment of FIG. 6 the user 116 may select a thumbnail 410(3) of the second portion 408 by touching and/or holding a section and/or surface of the display 402 associated with the desired thumbnail 410(3). As described above with respect to FIG.

5, when such a thumbnail 410(3) is selected by the user 116 in this way, the image 604 corresponding to the selected thumbnail 410(3) may be displayed in the first portion 404.

For example, the media message engine 108 may receive at least one digital content segment 112 in response to selection of one or more such thumbnails 410(3) by the user 116. In example embodiments, when the thumbnails 410(3) is selected in this way, the media message engine 108 may not only receive a first digital content segment 112 comprising a photo, video, image, and/or other content corresponding to the selected thumbnail 410(3), but may also receive a different second content segment 112 while the surface and/or portion of the display 402 corresponding to the thumbnail 410(3) is contacted by the hand 422 of the user 116. For example, in such embodiments the second digital content segment 112 may comprise audio or other like input captured by a microphone or other user interface device 314 of the electronic device 104 while the surface and/or portion of the display 402 corresponding to the thumbnail 410(3) is contacted by the hand 422 of the user 116. In such embodiments, receiving such first and second content segments 112 may cause, for example, the media message engine 108 or other components of the electronic device 104 to store at least one of the first and second content segments 112 in the memory 304 and/or in the memory 204 of the server 102. In some embodiments, the first digital content segment 112 may be stored separately from the second digital content segment 112. Additionally, the first and second digital content segments 112 may be added to the play sequence of the digital media message 114 such that the respective digital content segments 112 are presented simultaneously when the digital media message 114 is played.

In particular, in example embodiments in which the first digital content segment 112 comprises a photo, video, image, audio, and/or other content corresponding to the selected thumbnail 410(3), and a second digital content segment 112 comprises an audio segment, a video segment, or other like input captured by a user interface device 314 of the electronic device 104 while the surface and/or portion of the display 402 corresponding to the thumbnail 410(3) is contacted by the hand 422, the media message engine 108 may combine such first and second digital content segments 112. By combining such digital content segments, the second digital content segment 112 (e.g., an audio segment or a video segment) may be presented simultaneously with the first digital content segment 112 (e.g., a photo, video, image, audio, or other content) when the digital media message 114 is played. Combining digital content segments 112 in this way may include generating a combined segment that is configured such that, for example, audio from the second content segment 112 described above is presented simultaneously with at least one of a photo, video, image, audio, or other content of the first content segment 112 when a portion of the digital media message 114 corresponding to the combined segment is played. In such examples, the media message engine 108 may associate the combined segment with any position in the play sequence desired by the user 116.

Further, the user interface 600 may also include one or more controls configured to enable the user 116 to share the digital media message 112 with other users, such as users 120 of remote electronic devices 118. For example, the user interface 600 may include one or more share controls 606. In example embodiments, when one or more such share controls 606 is actuated by the user 116, the media message engine 108 may provide, such as via the display 402, a plurality of additional controls configured to assist the user 116 in providing the digital media message 114 for sharing with a remote electronic device 118. Such additional controls will be described in greater detail below.

Figure 7:
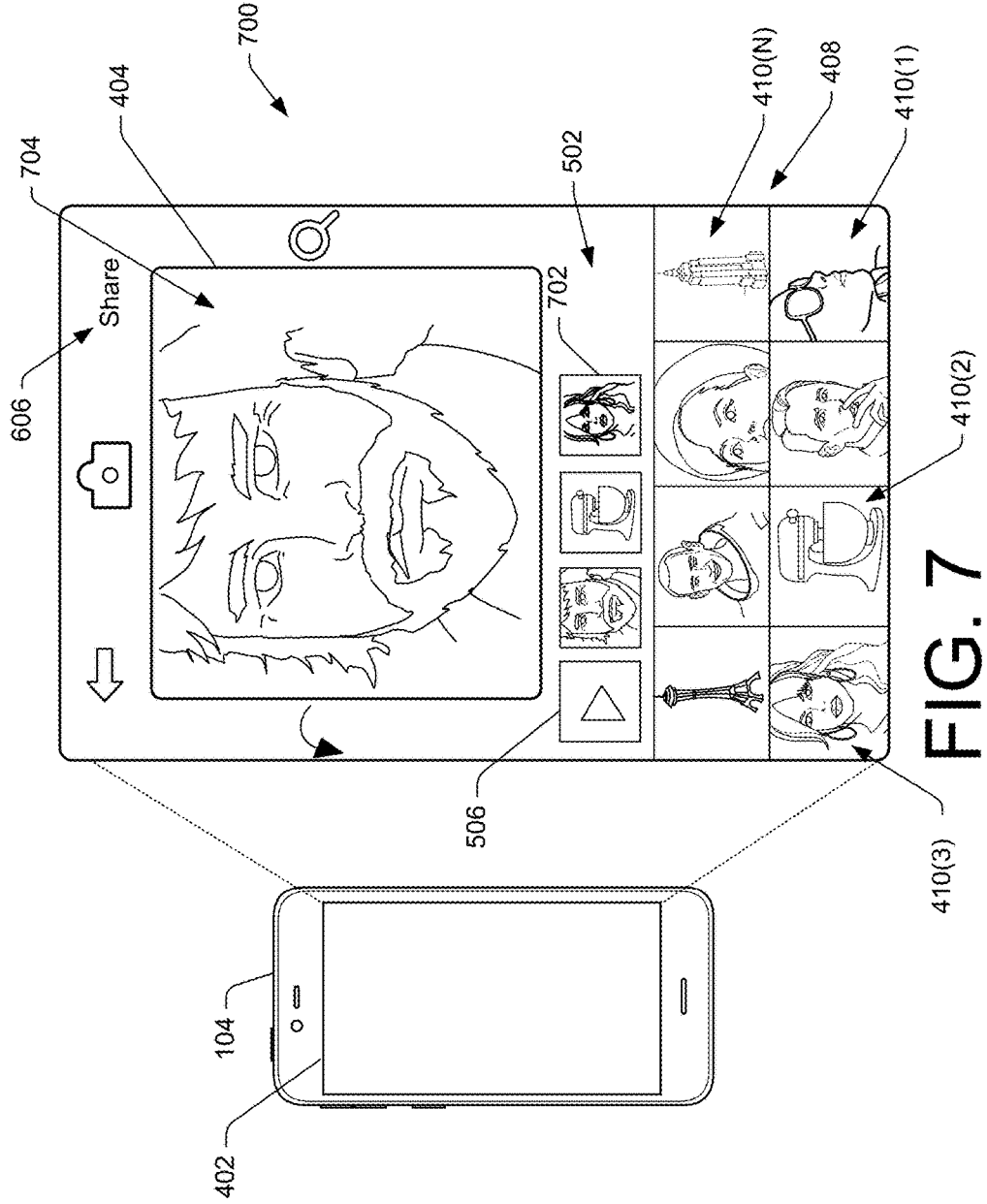
FIG. 7 shows yet another illustrative user interface screen displayed on an electronic device that enables users to generate a portion of an example digital media message.

FIG. 7 illustrates yet another example user interface 700 of the present disclosure. In example embodiments, the media message engine 108 may provide such an example user interface 700 during the process of generating a digital media message 114 and, for example, after a final digital content segment 112 has been received by the media message engine 108 via the electronic device 104. For example, the user interface 700 may include visual indicia of the play sequence 502 that includes the thumbnails described above with respect to FIGS. 5 and 6, as well as a thumbnail 702 illustrating and/or otherwise indicative of a digital content segment 112 associated with the image 604.

The user interface 700 may also include an image 704, and the image 704 may be one or more images, photos, or first frames of a video stored in the memory 304 of the electronic device 104. Alternatively, the content display module 308 may present one or more images 704 in the first portion 404 that are obtained in real time via, for example, a camera or other user interface device 314 of the electronic device 104. For example, the first portion 404 may provide an image 704 of objects that are within a field of view of the camera.

Figure 8:
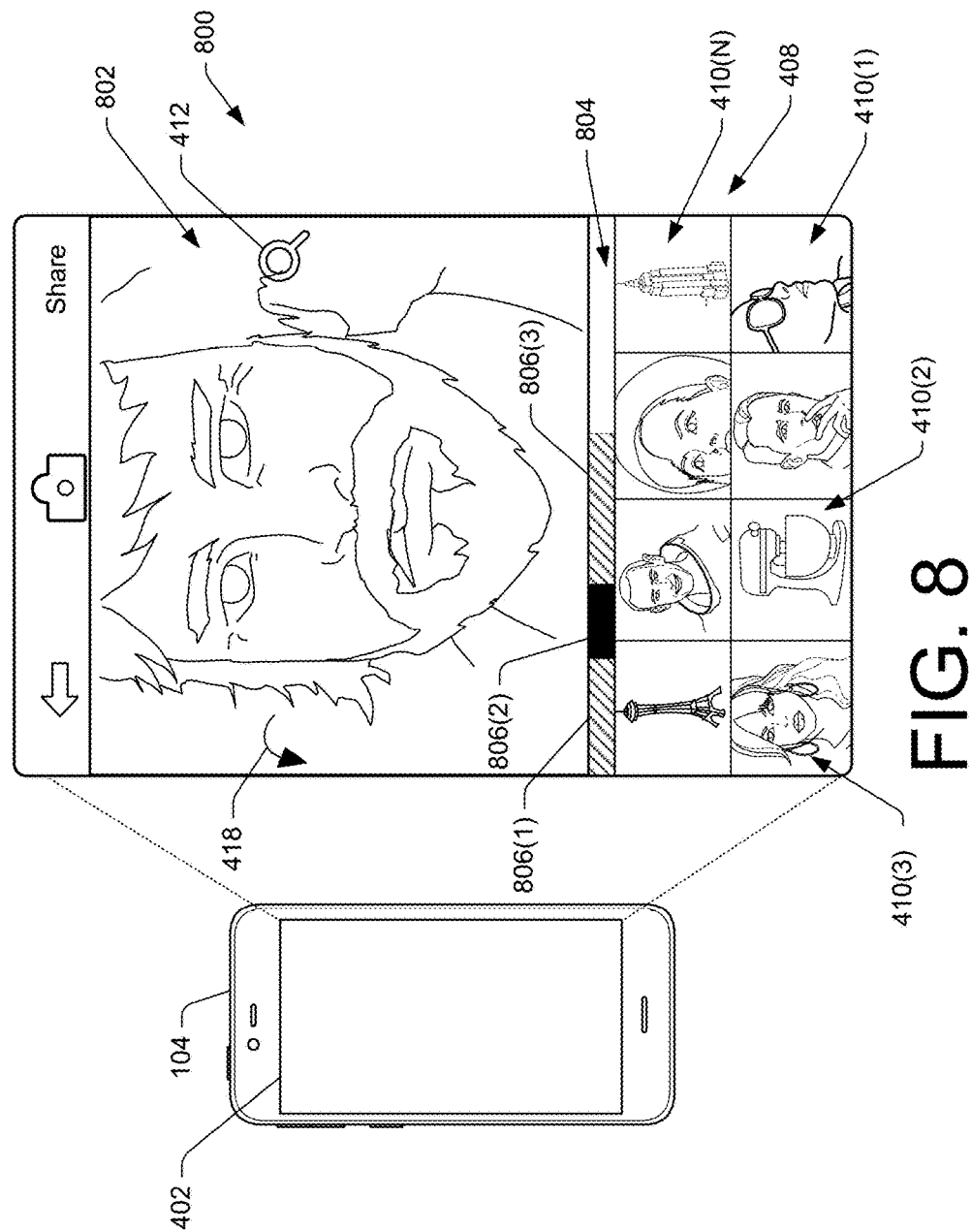
FIG. 8 shows an alternate view of the user interface screen shown in FIG. 7.

FIG. 8 illustrates still another example user interface 800 of the present disclosure. In example embodiments, the media message engine 108 may provide such an example user interface 800 in response to receiving one or more inputs via one or more of the controls described above. For example, the media message engine 108 may receive a touch input or other such input indicative of selection of the zoom control 412. In response to receiving such an input, the media message engine 108 may provide an enlarged (i.e, zoomed in) image 802 via the display 402. The enlarged image 802 may comprise, for example, a larger version of the image 704 described above with respect to FIG. 7. The image 802 may be one or more images, photos, or first frames of a video stored in the memory 304 of the electronic device 104. Alternatively, the content display module 308 may present one or more enlarged images 802 obtained in real time via, for example, a camera or other user interface device 314 of the electronic device 104.

In addition, the user interface 800 may include visual indicia of the play sequence of the digital media message 114, and such visual indicia may be in the form of a status bar 804. As noted above with respect to, for example, FIG. 5, such visual indicia may include a first portion corresponding to a first digital content segment 112 and a second portion corresponding to a second digital content segment 112. However, as shown in FIG. 8, in some embodiments, such portions may comprise a plurality of respective blocks 806(1), 806(2), 806(3) (collectively, "blocks 806") having shading, coloring, patterns, designs, images, shapes, sizes, or other respective characteristics enabling the user to visually distinguish between the respective blocks 806. Although the status bar 804 shown in FIG. 8 includes three blocks 806 (block 806(1) corresponding to a first digital content segment 112 associated with the thumbnail 504, block 806(2) corresponding to a second digital content segment 112 associated with the thumbnail 602, and block 806(3) corresponding to a third digital content segment 112 associated with the thumbnail 702), in further example embodiments, the status bar 804 may include greater than or less than three blocks 806 depending on, for example, the number of digital content segments 112 to be included in the digital media message 114. In such example embodiments, the status bar 804 illustrated in FIG. 8 may be a convenient way for the user 116 to visualize the configuration, length, and/or other characteristics of the play sequence of such a digital media message 114 while the enlarged image 802 is being displayed.

Figure 9:
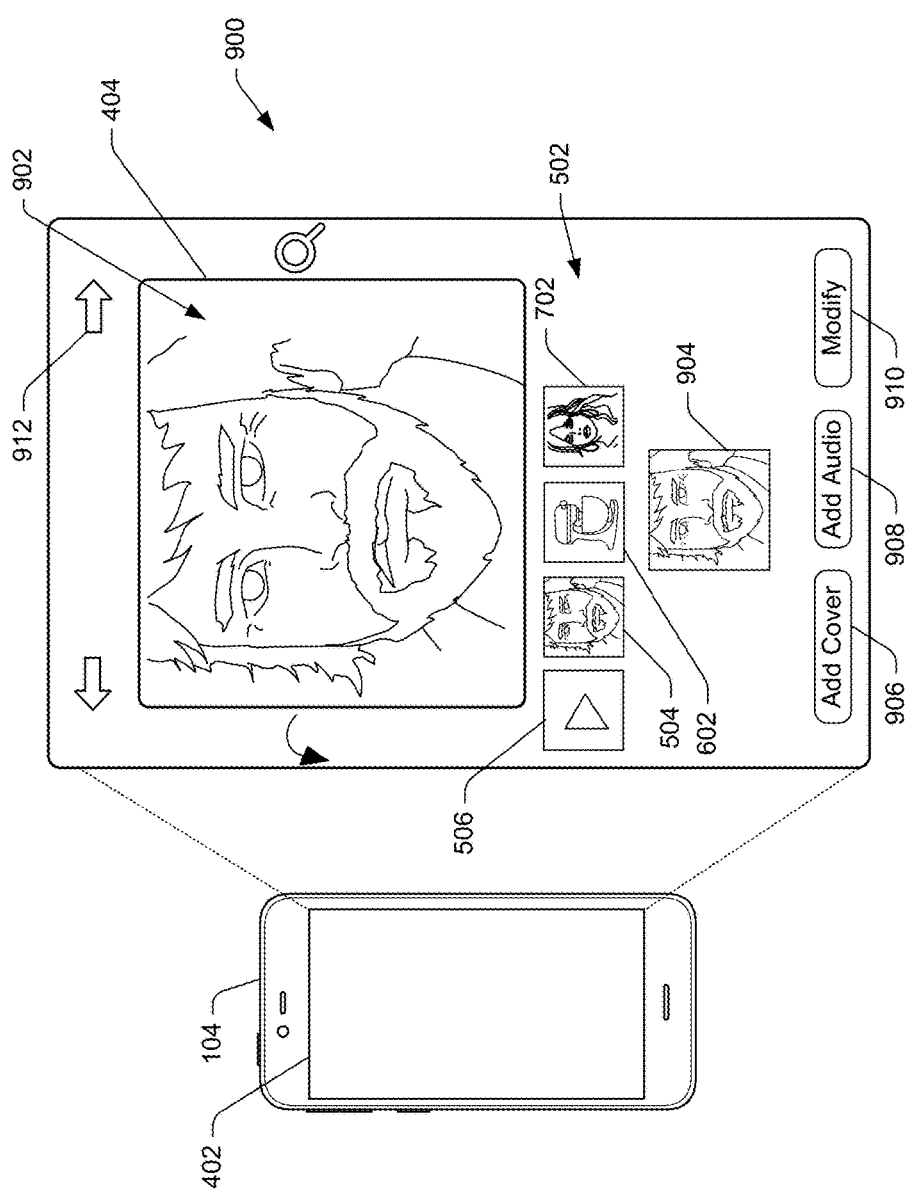
FIG. 9 shows another illustrative user interface screen displayed on an electronic device that enables users to generate a portion of an example digital media message.

FIG. 9 illustrates another example user interface 900 of the present disclosure. In example embodiments, the media message engine 108 may provide such an example user interface 900 in response to receiving one or more inputs via one or more of the controls described above. For example, the media message engine 108 may receive a touch input or other such input indicative of selection of the share control 606. In response to receiving such an input, the media message engine 108 may provide an image 902 via the display 402. Such an image 902 may comprise, for example, one or more images, photos, or first frames of a video stored in the memory 304 of the electronic device 104. Alternatively, as described above with respect to FIG. 7, the content display module 308 may present one or more images 902 in the first portion 404 that are obtained in real time via, for example, a camera or other user interface device 314 of the electronic device 104. For example, the first portion 404 may provide an image 902 of objects that are within a field of view of the camera.

The media message engine 108 may also provide a message thumbnail 904 via the display 402. In example embodiments, such a message thumbnail 904 may be similar to one or more of the thumbnails 504, 602, 702 described above with respect to the visual indicia of the play sequence 502. In some examples, however, the message thumbnail 904 may be larger than one or more of the thumbnails 504, 602, 702, and/or may have one or more visual characteristics (e.g., highlighting, shading, a label, a frame, etc.) configured to make it easier for the user 116 to distinguish the message thumbnail 904 from one or more of the thumbnails 504, 602, 702. For example, the message thumbnail 904 may be disposed above, beneath, to the side of, and/or at any other location on the display 402 such that the user 116 may easily identify the message thumbnail 904 as being distinct from the thumbnails 504, 602, 702 and/or other visual indicia of the play sequence 502. In example embodiments, the message thumbnail 904 may comprise, for example, a first frame and/or any other image or content indicative of the digital media message 114 being generated by the user 116. As a result, it may be desirable for the media message engine 108 to present the message thumbnail 904 with one or more visual characteristics enabling the user 116 to identify the message thumbnail 904 with relative ease.

The example user interface 900 may also include one or more additional controls configured to assist the user 116 in making further modifications to one or more of the digital content segments 112, the play sequence, and/or other components of the digital media message 114. For example, the user interface 900 may include a control 906 configured to enable the user 116 to add one or more cover images, cover videos, cover photos, and/or other content to the digital media message 114. In example embodiments, the media message engine 108 may receive an input, such as a touch input, indicative of selection of the control 906 by the user 116. In response to receiving such an input, the media message engine 108 may enable the user 116 to browse various photos, images, videos, and/or other content stored in the memory 304 and/or in the memory 204 of the server 102. Additionally and/or alternatively, in response to receiving such an input, the media message engine 108 may enable the user 116 to perform a web-based search, such as via one or more search engines or applications of the electronic device 104, for such content. The user 116 may be permitted to select one or more such content items for use as, for example, a cover image and/or other indicator of the digital media message 114 currently being generated. Upon selection of such a content item, the media message engine 108 may add the selected item to the play sequence of the digital media message 114 and/or may combine the selected item with one or more content segments 112 of the digital media message 114.

Additionally, the user interface 900 may include one or more controls 908 configured to enable the user 116 to add one or more audio clips, segments, files, and/or other content to the digital media message 114. In example embodiments, the media message engine 108 may receive an input, such as a touch input, indicative of selection of the control 908 by the user 116. In response to receiving such an input, the media message engine 108 may enable the user 116 to browse various audio files and/or other content stored in the memory 304 and/or in the memory 204 of the server 102. Additionally and/or alternatively, in response to receiving such an input, the media message engine 108 may enable the user 116 to perform a web-based search, such as via one or more search engines or applications of the electronic device 104, for such content. The user 116 may be permitted to select one or more such content items, and upon selection of such a content item, the media message engine 108 may add the selected item to the play sequence of the digital media message 114 and/or may combine the selected item with one or more content segments 112 of the digital media message 114.

The user interface 900 may further include one or more controls 910 configured to enable the user 116 to modify one or more of the digital content segments 112, the play sequence, and/or other components of the digital media message 114. Such controls 910 may comprise, among other things, any audio, video, image, or other editing tools known in the art. In example embodiments, such controls 910 may provide editing functionality enabling the user 116 to delete, move, modify, augment, cut, paste, copy, save, or otherwise alter portions of each digital content segment 112 as part of generating a digital media message 114. Additionally, one or more of the controls 910 may enable a user 116 to add, remove, cut, paste, draw, rotate, flip, shade, color, fade, darken, and/or otherwise modify various aspects of the digital media message 114 and/or various digital content segments 112 included in the play sequence thereof. In some embodiments, at least one of the controls 910 may be similar to and/or the same as one or more of the controls 418 described above.

The user interface 900 may also include one or more navigation controls 912. Such navigation controls 912 may be substantially similar to and/or the same as one or more of the navigation controls 416 described above. For example, at least one of the navigation controls 912 may comprise a "forward" control. Upon selection thereof by the user 116, the media message engine 108 may enable the user 116 to browse forward to a next user interface configured to assist the user 116 in generating, modifying, and/or sharing the digital media message 114.

Figure 10:
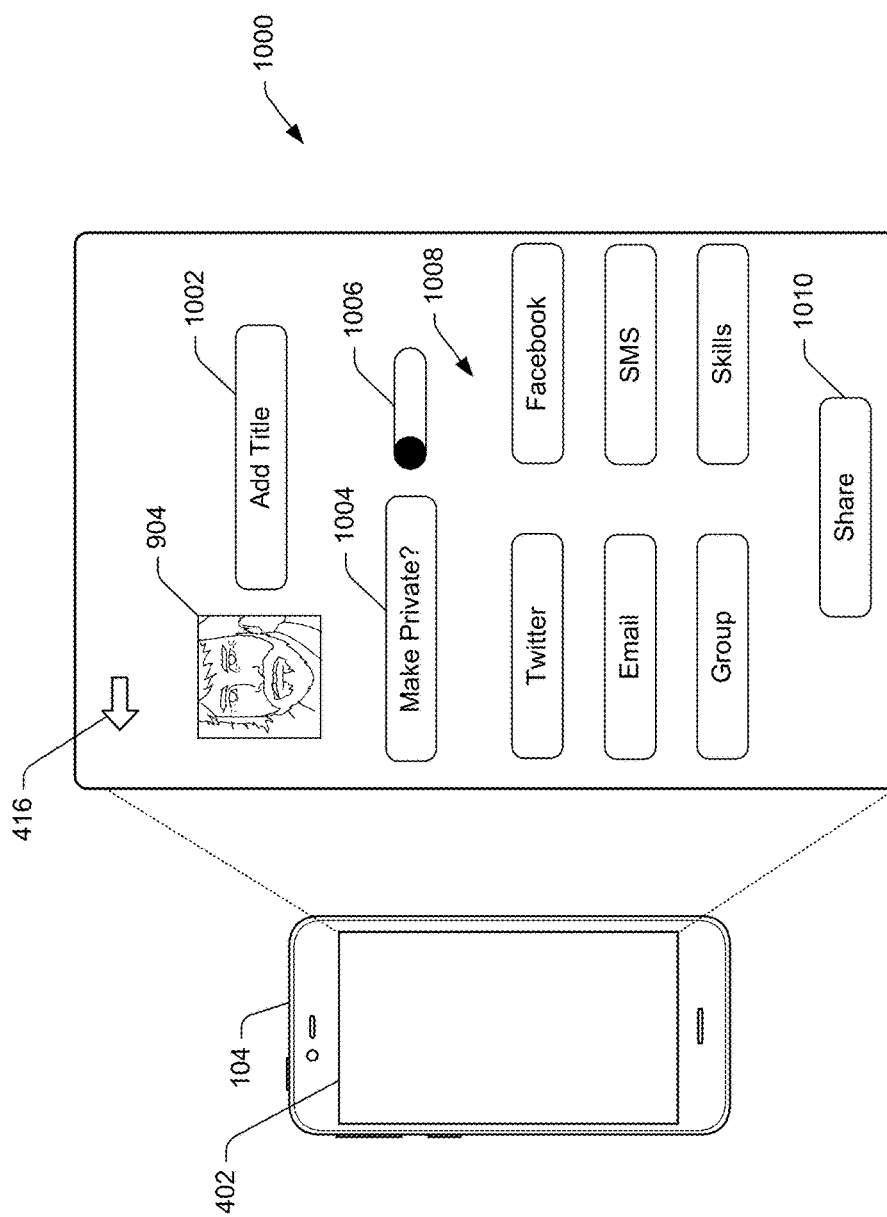
FIG. 10 shows an illustrative user interface screen displayed on an electronic device that enables users to share an example digital media message.

For example, the media message engine 108 may receive an input, such as a touch input, indicative of selection of the control 912 by the user 116. In response to receiving such an input, the media message engine 108 may provide the example user interface 1000 illustrated in FIG. 10. Such an example user interface 1000 may include, among other things, the message thumbnail 904 indicating and/or otherwise identifying the digital media message 114 that the user 116 desires to share. Such an example user interface 1000 may also include a plurality of controls configured to assist the user 116 in providing the digital media message 114 for sharing with, for example, a remote electronic device 118, such as via the network 106. For example, one or more of the controls 1002 may enable the user 116 to add a title, a name, and/or other identifier to the media message 114 such that the media message 114 may be easily recognizable and/or identifiable by one or more users 120 of the remote electronic device 118. In some examples, the title and/or other identifier added to the media message 114 may be provided to the user 120 simultaneously and/or otherwise in conjunction with the digital media message 114 when the user 120 consumers at least a portion of the digital media message 114 on the remote electronic device 118.

In addition, the user interface 1000 may include one or more controls 1004, 1006 configured to enable the user 116 to privatize the digital media message 114 prior to providing the digital media message 114 for sharing with a remote electronic device 118. For example, one or more such controls 1004 may enable the user 116 to encrypt and/or otherwise configure the digital media message 114 such that only an approved user 120 or plurality of users 120 may receive and/or access the digital media message 114. In example embodiments, the media message engine 108 may receive an input, such as a touch input, indicative of selection of the control 1004 by the user 116. In response to receiving such an input, the media message engine 108 may enable the user 116 to browse, for example, an address book or other like directory stored in the memory 304 of the electronic device 104 and/or in the memory 204 of the server 102. Upon browsing such a directory, the user 116 may select one or more contacts approved by the user 116 to have access to the digital media message 114. Additionally and/or alternatively, in response to receiving such an input, the media message engine 108 may enable the user 116 to password protect and/or otherwise encrypt the digital media message 114 prior to sharing. In any of the example embodiments described herein, one or more of the controls 1006 may comprise a slide bar and/or other like icon indicating whether the user 116 has privatized the digital media message 114. For example, such a control 1006 may change color, transition between a "no" indication and a "yes" indication, and/or may otherwise provide a visual indication of the privacy status/level of the digital media message 114.

The user interface 1000 may also include one or more controls 1008 configured to enable the user 116 to select one or more means of providing the digital media message 114 for sharing with a remote electronic device 118. For example, one or more such controls 1008 may enable the user 116 to select from a plurality of common social media websites and/or other portals useful in sharing the digital media message 114. In such example embodiments, the media message engine 108 may receive an input, such as a touch input, indicative of selection of the control 1008 by the user 116. In response to receiving such an input, the media message engine 108 may enable the user 116 to access an existing account on the selected social media portal. Once such an account has been accessed, the media message engine 108 may provide the digital media message 114 to the selected social media portal for sharing with remote users 120 via the selected portal.

One or more such controls 1008 may also enable the user 116 to select between email, text messaging (SMS), instant messaging, and/or other like means for sharing the digital media message 114. In such example embodiments, the media message engine 108 may receive an input, such as a touch input, indicative of selection of the control 1008 by the user 116. In response to receiving such an input, the media message engine 108 may enable the user 116 to browse, for example, an address book or other like directory stored in the memory 304 of the electronic device 104 and/or in the memory 204 of the server 102. Upon browsing such a directory, the user 116 may select one or more contacts with which the user 116 desires to share the digital media message 114. Upon selecting such contacts, the user 116 may provide the digital media message 114 to the selected users by providing an input, such as a touch input, indicative of selection of a share control 1010.

Illustrative Methods

Figure 11:
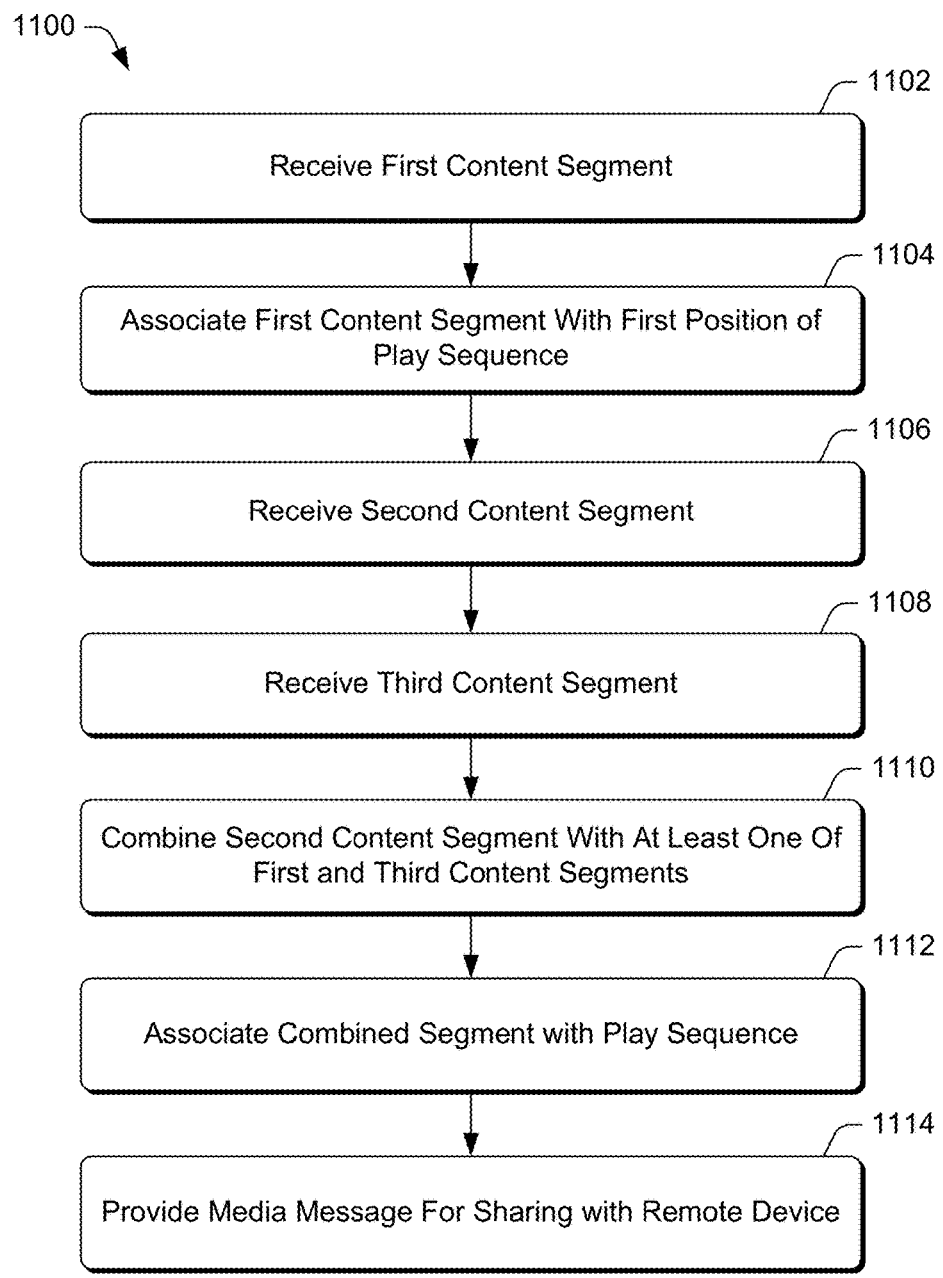
FIG. 11 is a flow diagram of an illustrative method of generating a digital media message.

FIG. 11 shows an illustrative method 1100 of generating an example digital media message 114. The example method 1100 is illustrated as a collection of steps in a logical flow diagram, which represents a sequence of operations that can be implemented in hardware, software, or a combination thereof. In the context of software, the steps represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 1100 is described with reference to the environment 100 of FIG. 1.

At block 1102, the media message engine 108 may receive a first digital content segment 112(1) via the electronic device 104. For example, in some embodiments the first digital content segment 112(1) may be one of a video segment, an audio segment, a photo, an image, and/or other such content. In some embodiments, receiving the first content segment 112(1) at block 1102 may include causing the electronic device 104 to capture a first video segment, audio segment, photo, image, or other such content using one or more of the user interface devices 314. In such an example, the media message engine 108 may cause the captured first content segment 112(1) to be stored in the memory 304 and/or the memory 204 of the server 102 for future use.

Additionally, in some embodiments receiving the first content segment 112(1) at block 1102 may include receiving input from the user 116, such as a touch input received via the display 402, indicative of a selection of a thumbnail 410 associated with the first digital content segment 112(2). For example, as noted above with respect to at least FIG. 4, the media message engine 108 may present a plurality of thumbnails 410 to the user 116 via the display 402. In such embodiments, each thumbnail 410 may represent a respective digital content segment 112 of a plurality of digital content segments stored in the memory 304 and/or the memory 204. In such examples, the input received from the user 116 may be indicative of a selection of a particular thumbnail 410 corresponding to the first digital content segment 112(1). Accordingly, in such embodiments the media message engine 108 may receive the first content segment 112(1) by way of the user 116 selecting the particular thumbnail 410 corresponding to the first digital content segment 112(1).

At block 1104, the media message engine 108 may associate the first digital content segment 112 with a respective first position in a play sequence of the digital media message 114 being generated. In such examples, the media message engine 108 may present visual indicia of the play sequence 502 via the display 402, and a first portion and/or position of the play sequence may correspond to the first digital content segment 112(1). For example, the media message engine 108 may present a first thumbnail 504 corresponding to the first digital content segment 112(1) at a first position in the play sequence as an indication that the first content segment 112(1) has been associated with the first position.

At block 1106, the media message engine 108 may receive a second digital content segment 112(2), and in some examples the second digital content segment 112(2) may be different from the first digital content segment 112(1). In some embodiments, receiving the second content segment 112(2) at block 1106 may include causing the electronic device 104 to capture a second video segment, audio segment, photo, image, or other such content using one or more of the user interface devices 314. Additionally, in some embodiments receiving the second content segment 112(2) at block 1106 may include receiving input from the user 116, such as a touch input received via the display 402, indicative of a selection of a thumbnail 410(2) associated with the second digital content segment 112(2).

At block 1108, the media message engine 108 may receive a third digital content segment 112(3), and in some examples the third digital content segment 112(3) may be different from the first and second digital content segments 112(1), 112(2) described above. For example, as described above with respect to at least FIG. 5, in some embodiments the user 116 may select a thumbnail 410(2) by touching and/or holding a portion of the display 402 corresponding to the desired thumbnail 410(2). When such a thumbnail 410 is selected in this way, the media message engine 108 may receive the image 508 and/or other second digital content segment 112(2) corresponding to the selected thumbnail 410(2) at block 1106. Additionally, the media message engine 108 may cause the image 508 to be displayed by the display 402 at block 1106. Additionally, when the thumbnail 410(2) is touched and/or held in this way, the media message engine 108 may also receive, at block 1108, a third digital content segment 112(3) as long as the surface and/or portion of the display 402 corresponding to the thumbnail 410(2) is contacted by the hand 422 of the user 116. For example, in such embodiments the third digital content segment 112(3) may comprise audio or other like input captured by a microphone or other user interface device 314 of the electronic device 104 while the surface and/or portion of the display 402 corresponding to the thumbnail 410(2) is contacted by the hand 422 of the user 116. In example embodiments, the first digital content segment 112(1) may be captured by and/or received from a first component of the electronic device 104, and at least one of the second and third digital content segments 112(2), 112(3) may be captured by and/or received from a second component of the electronic device 104 different from the first component. For example, as noted above, any of the digital content segments 112 may be captured by and/or received from one or more of the camera, video camera, microphone, web browser, network interface devices, user interface device 314, or other such components.

At block 1110, the media message engine 108 may combine, for example, the second digital content segment 112(2) received at block 1106 with at least one of the first and third digital content segments 112(1), 112(3). For example, at block 1110, the media message engine 108 may form a combined segment by combining the second digital content segment 112(2) with at least one of the first and third digital content segments 112(1), 112(3). In such examples, the media message engine 108 may configure the combined segment such that the second digital content segment 112(2) is presented simultaneously with at least one of the first and third digital content segments 112(1), 112(3) when the digital media message 114 is played.

At block 1112, the media message engine 108 may associate the combined segment formed at block 1110 with the play sequence of the digital media message 114. For example, in embodiments in which the media message engine 108 combines the second content segment 112(2) with the third digital content segment 112(3) to form the combined segment at block 1110, the first content segment 112 received at block 1102 may be associated with a first position of the play sequence, and the combined segment may be associated with a second position of the play sequence following and/or after the first position. In example embodiments, the media message engine 108 may, at block 1110, add the second and third digital content segments 112(2), 112(3) to the play sequence of the digital media message 114 such that the second digital content segment 112(2) is presented simultaneously with at least one of the first and third digital content segments 112(1), 112(3) when the digital media message 114 is played.

At block 1114, the media message engine 108 may provide the digital media message 114 for sharing with a remote electronic device 118, and the digital media message 114 may include at least the combined segment formed at block 1110. In further example embodiments, the digital media message 114 may include at least the first, second, and third digital content segments 112(1), 112(2), 112(3). In example embodiments, providing the digital media message 114 for sharing at block 1114 may include, among other things, directing the digital media message 114, via the electronic device 104, to the network 106. Accordingly, the digital media message 114 may be transferred over the network 106, and may be provided to a remote user 120 via at least one of a text message, an email, and/or a website, such as a social media website.

Figure 12:
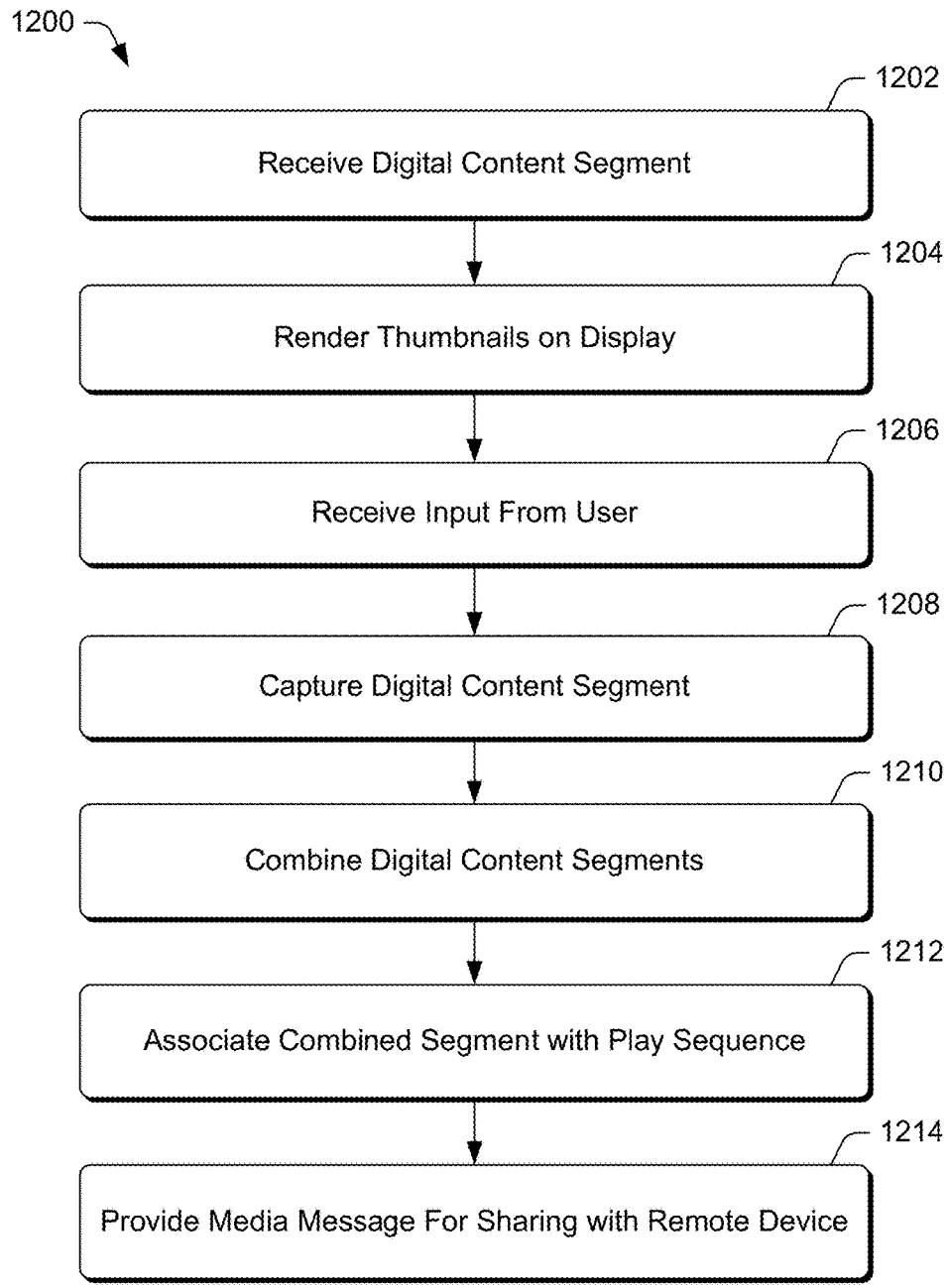
FIG. 12 is a flow diagram of another illustrative method of generating a digital media message.
Figure 13:
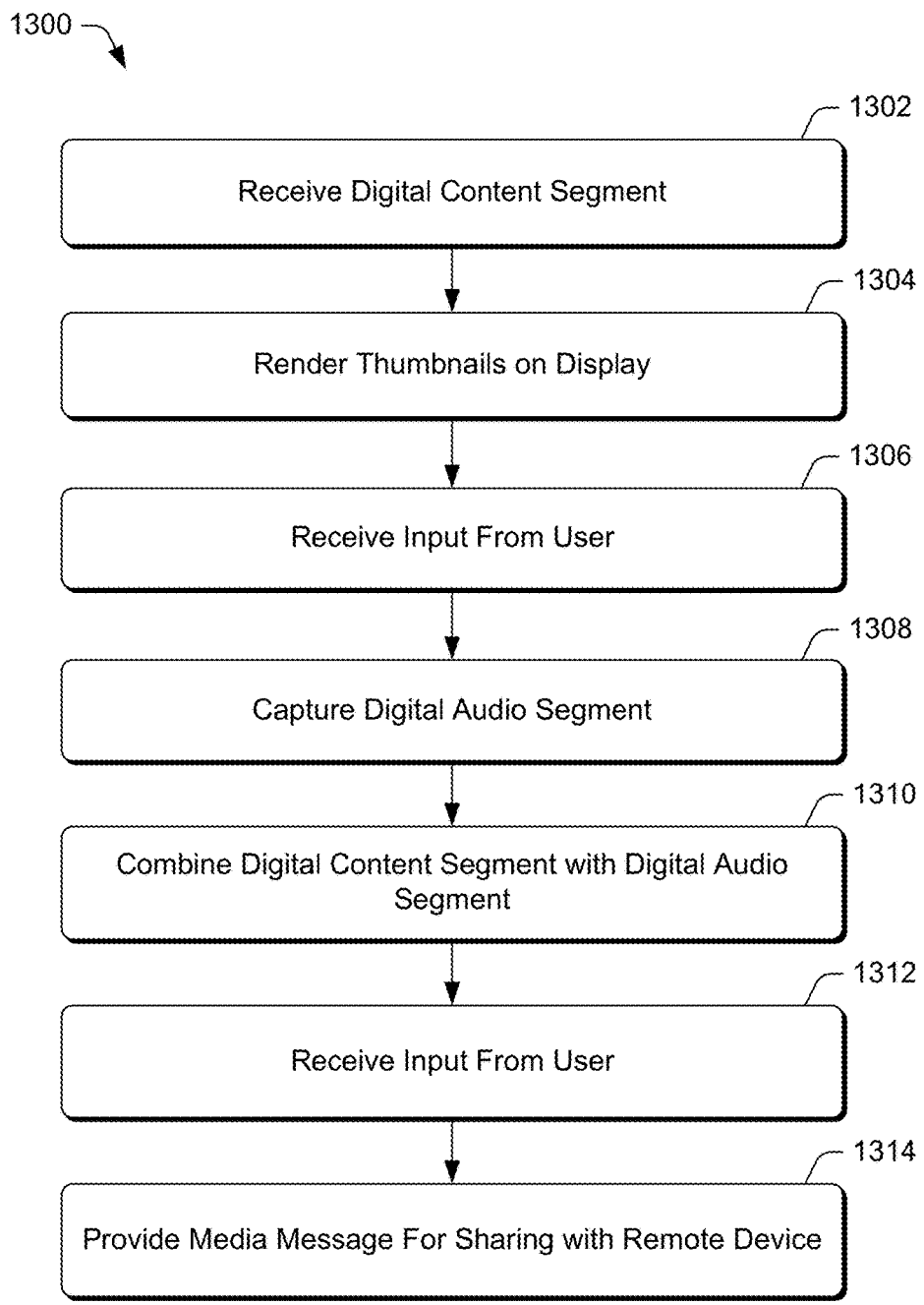
FIG. 13 is a flow diagram of a further illustrative method of generating a digital media message.

In some example embodiments of the present disclosure, the systems described herein may enable the user of the device 104 to generate a digital media message 114 through a process that minimizes the number of inputs required from the user. Such example embodiments may be advantageous due to the simplicity of the digital media message generation process, and due to the reduction in time and effort required to generate such messages 114. Accordingly, such embodiments may be well-suited for generating and sharing digital media messages 114 as a vehicle for substantially real-time content-rich communication between users. FIGS. 12 and 13 show methods 1200, 1300 of generating digital media messages 114 according to such example embodiments.

With reference to the method 1200 illustrated in FIG. 12, at block 1202, the media message engine 108 may receive one or more digital content segments 112 via the electronic device 104. For example, in some embodiments the one or more digital content segments 112 received at block 1202 may be one of a video segment, an audio segment, a photo, an image, and/or other such content. In some embodiments, receiving the content segment 112 at block 1202 may include causing the electronic device 104 to capture a video segment, audio segment, photo, image, or other such content using one or more of the user interface devices 314. In such an example, the media message engine 108 may cause the captured content segment 112 to be stored in the memory 304 and/or the memory 204 of the server 102. Additionally, in some embodiments receiving the content segment 112 at block 1202 may include receiving input from the user 116, such as a touch input received via the display 402. Such an input may cause the one or more user interface devices 314 to capture the content segment 112.

At block 1204, the media message engine 108 may present a plurality of thumbnails 410 to the user 116 via the display 402. Example thumbnails 410 are described herein with respect to at least FIG. 4. For example, each thumbnail 410 rendered at block 1204 may represent a respective digital content segment 112 of a plurality of digital content segments stored in the memory 304 and/or the memory 204. In some embodiments, a first thumbnail 410(1) of the plurality of thumbnails 410 may be representative of a digital image stored in the memory 304 and/or the memory 204. Additionally, a second thumbnail 410(2) of the plurality of thumbnails 410 may be representative of a digital video segment stored in the memory 304 and/or the memory 204. In such examples, the thumbnails 410 described herein may be rendered in the second portion 408 of the display 402. For example, the first thumbnail 410(1) may be rendered at a first location in the second portion 408, and the second thumbnail 410(2) may be rendered at a second location in the second portion 408 different from the first location. In such examples, the input received from the user 116 via a particular thumbnail 410 may be indicative of a selection of either a digital image or a digital video segment corresponding to the particular thumbnail 410.

At block 1206, the media message engine 108 may receive an input from the user 116, such as a touch input or a touch and hold input, indicative of a selection of the digital content segment 112 represented by a corresponding thumbnail 410. For example, in embodiments in which a thumbnail 410(1) is representative of a digital image, a touch and hold input received at the first location in which the thumbnail 410(1) is rendered may indicate selection of the digital image. At block 1208, the media message engine 108 may cause the digital image corresponding to the thumbnail 410(1) to be displayed in the first portion 404 of the display 402 in response to the touch and hold input. Additionally, the thumbnail 410(1) corresponding to the digital image may be rendered in the second portion 408 of the display 402, with a plurality of additional thumbnails 410, while the digital image is rendered within the first portion 404. As noted above, at least one of the additional thumbnails 410 rendered in the second portion 408 may be representative of a digital video segment. Further, in embodiments in which a thumbnail 410(2) is representative of a digital video segment, a touch and hold input received at the second location in which the thumbnail 410(2) is rendered may indicate selection of the digital video segment. In such examples, the media message engine 108 may cause at least part of the digital video segment corresponding to the thumbnail 410(2) to be displayed (e.g., played) in the first portion 404 of the display 402 in response to the touch and hold input.

In some examples, the input may be received at block 1206 for a duration that is defined by the length of time during which the hand 422 of the user 116 contacts the display 402. For example, a touch and hold input received at block 1206 may include a beginning at and/or otherwise characterized by the point in time at which the hand 422 first and/or initially contacts the display 402. The touch and hold input may also include an end at and/or otherwise characterized by the point in time at which contact, such as continuous and/or substantially uninterrupted contact, between the hand 422 and the display 402 is discontinued. In such examples, the touch and hold input may also include a duration defined by the beginning and the end. For example, the duration of the touch and hold input may be the amount of time elapsed between the beginning and the end. Such a duration may be, for example, the amount of time during which uninterrupted contact between the hand 422 and the display 402 is maintained.

As explained above with respect to at least FIG. 5, when a touch and hold input is received via one of the thumbnails 410 rendered in the first portion 408, the media message engine 108 may receive an additional content segment as long as the surface and/or portion of the display 402 corresponding to the thumbnail 410 is contacted by the hand 422 of the user 116. For example, at block 1208 the media message engine 108 may control one or more of the user interface devices 314 to capture an additional digital content segment 112 in response to the input received at block 1206. In such embodiments the additional digital content segment 112 may comprise an audio segment or other like input captured by a microphone or other user interface device 314 of the electronic device 104 while the surface and/or portion of the display 402 corresponding to the thumbnail 410 is contacted by the hand 422 of the user 116. In example embodiments, the digital content segment 112 received at block 1202 may be captured by and/or received from a first component of the electronic device 104, and the additional digital content segment captured at block 1208 may be captured by and/or received from a second component of the electronic device 104 different from the first component. For example, as noted above, any of the digital content segments 112 described herein may be captured by and/or received from one or more of the camera, video camera, microphone, web browser, network interface devices, user interface devices 314, or other such components.

Additionally, a duration of the additional digital content segment 112 captured at block 1208 may be defined by the duration of the touch and hold input received at 1206. For example, the additional digital content segment 112 may include a beginning corresponding to the beginning of the touch and hold input. The additional digital content segment 112 may also include an end corresponding to the end of the touch and hold input. In such examples, the duration of the additional digital content segment 112 may be the amount of time elapsed between the beginning and the end of the additional digital content segment 112, and such a duration may be equal to the duration of the touch and hold input received at block 1206. For example, the initial contact between the display 402 and the hand 422 of the user 116 may commence capturing of the additional digital content segment 112, and the discontinuation of contact between the display 402 and the hand 422 may cease capturing of the additional digital content segment 112.

At block 1210, the media message engine 108 may combine, in response to the touch and hold input received at block 1206, for example, the digital content segment 112 received at block 1202 with the additional digital content segment 112 captured at block 1208. For example, at block 1210 the media message engine 108 may form a combined segment by combining the digital image corresponding to the thumbnail 410 at which the input was received at block 1206, with the audio segment or other additional digital content segment 112 captured at block 1208. In such examples, the digital image may comprise at least a portion of a video track of the combined segment, and the audio segment may comprise at least a portion of a corresponding but separate audio track of the combined segment. In other examples, at block 1210 the media message engine 108 may form a combined segment by combining the digital video segment corresponding to the thumbnail 410 at which the input was received at block 1206, with the audio segment or other additional digital content segment 112 captured at block 1208. In such an example, the digital video segment may already include an audio track and a separate corresponding video track. Accordingly, at block 1210 the media message engine 108 may replace at least a portion of (and in some examples, all of) either the audio track or the video track of the digital video segment with the additional digital content segment 112 captured at block 1208. For example, at block 1210 the media message engine 108 may replace at least a portion of the audio track of the digital video segment corresponding to the thumbnail 410 at which the input was received, with the audio segment captured at block 1208.

In any of the embodiments described herein, the media message engine 108 may configure the combined segment formed at block 1210 such that the digital content segments 112 included in the combined segment are presented simultaneously when the digital media message 114 is played. For example, the media message engine 108 may configure the combined segment such that the digital image described above with respect to block 1204 is presented simultaneously with the additional digital content segment 112 (e.g., a digital audio segment) captured at block 1208 when the digital media message 114 is played. In further examples, the media message engine 108 may configure the combined segment such that at least part of the video track of the digital video segment described above with respect to block 1204 is presented simultaneously with the additional digital content segment 112 (e.g., the digital audio segment) captured at block 1208 when the digital media message 114 is played.

At block 1212, in some examples the media message engine 108 may associate the combined segment formed at block 1210 with a play sequence of the digital media message 114. For example, the media message engine 108 may dispose and/or otherwise associate the combined segment with a respective position of the play sequence. In some examples, the position of the combined segment in the play sequence may comprise a first position of the play sequence, and one or more digital content segments 112 may be included in the play sequence at other respective positions different from the first position. Such other respective positions may be, for example, before or after the first position associated with the combined segment. Alternatively, in some examples, the entire duration of the digital media message 114 may be equal to and/or may otherwise be defined by the duration of the combined segment. In such examples, the entire play sequence may consist of the combined segment. Further, in such examples, the duration of the digital media message 114 may be equal to and/or may otherwise be defined by the duration of one or more of the digital content segments 112 used by the media message engine 108 to generate the combined segment at block 1210. For example, the duration of the digital media message 114 may be equal to and/or may otherwise be defined by the duration of the digital audio segment captured at block 1208. In additional examples, the duration of the digital media message 114 may be equal to and/or may otherwise be defined by the sum of the duration of the digital audio segment captured at block 1208 and an additional length of time during which at least a portion of the audio track of the digital video segment, and a corresponding portion of the video track of the digital video segment, are included in the combined segment.

At block 1214, the media message engine 108 may provide the digital media message 114 for sharing with a remote electronic device 118, and the digital media message 114 may include at least the combined segment formed at block 1210. In example embodiments, providing the digital media message 114 for sharing at block 1214 may include, among other things, directing the digital media message 114, via the electronic device 104, to the network 106. Accordingly, the digital media message 114 may be transferred over the network 106, and may be provided to a remote user 120 via at least one of a text message, an email, and/or a website, such as a social media website.

Figure 14:
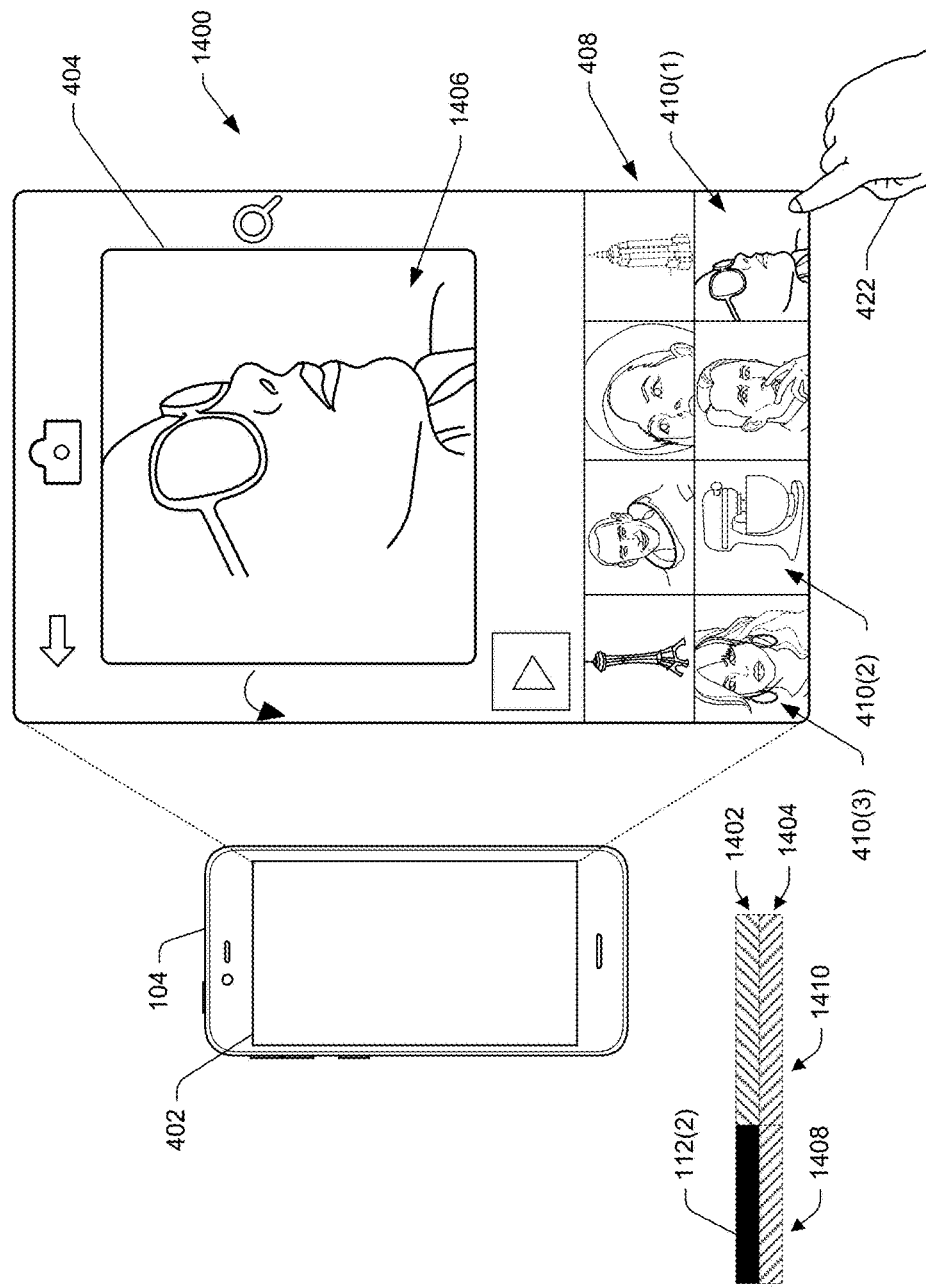
FIG. 14 shows an illustrative user interface screen displayed on an electronic device, as well as example audio and video tracks.

With reference to the method 1300 illustrated in FIG. 13, at block 1302, the media message engine 108 may receive one or more digital content segments 112 via the electronic device 104. For example, in some embodiments the one or more digital content segments 112 received at block 1302 may be one of a video segment, an audio segment, a photo, an image, and/or other such content. In some embodiments, receiving the content segment 112 at block 1302 may include causing the electronic device 104 to capture a video segment, audio segment, photo, image, or other such content using one or more of the user interface devices 314. In such an example, the media message engine 108 may cause the captured content segment 112 to be stored in the memory 304 and/or the memory 204 of the server 102. Additionally, in some embodiments receiving the content segment 112 at block 1302 may include receiving input from the user 116, such as a touch input received via the display 402. Such an input may cause the one or more user interface devices 314 to capture the content segment 112. For the duration of this disclosure, the digital content segment 112 received at block 1302 will be described as a digital video segment 112(1). Further, in some examples the digital video segment 112(1) may include an audio track and a corresponding but separate video track. Example audio and video tracks 1402, 1404 of the digital video segment 112(1) are illustrated in FIG. 14 along with an example user interface 1400.

At block 1304, the media message engine 108 may present a plurality of thumbnails 410 to the user 116 via the display 402. For example, each thumbnail 410 rendered at block 1304 may represent a respective digital content segment 112 of a plurality of digital content segments stored in the memory 304 and/or the memory 204. In some embodiments, a first thumbnail 410(1) of the plurality of thumbnails 410 may be representative of the digital video segment 112(1) stored in the memory 304 and/or the memory 204. As shown in FIG. 14, the thumbnails 410 may be rendered in the second portion 408 of the display 402. For example, the first thumbnail 410(1) may be rendered at a first location in the second portion 408, and at least one additional thumbnail 410(2) may be rendered at a second location in the second portion 408 different from the first location.

At block 1306, the media message engine 108 may receive an input from the user 116, such as a touch input or a touch and hold input, indicative of a selection of the digital content segment 112 represented by a corresponding thumbnail 410. For example, in embodiments in which the thumbnail 410(1) is representative of the digital video segment 112(1), a touch and hold input received at the first location in which the thumbnail 410(1) is rendered may indicate selection of the digital video segment 112(1). At block 1308, the media message engine 108 may cause at least part 1406 of the digital video segment 112(1) corresponding to the thumbnail 410(1) to be displayed (e.g., played) in the first portion 404 of the display 402 in response to the touch and hold input. Additionally, the thumbnail 410(1) corresponding to the digital video segment 112(1) may be rendered in the second portion 408 of the display 402, with a plurality of additional thumbnails 410, while the digital video segment 112(1) is played in the first portion 404.

Similar to the input described above with respect to block 1206 of FIG. 12, the input may be received at block 1306 for a duration that is defined by the length of time during which a hand 422 (e.g., one of a right hand or a left hand) of the user 116 contacts the display 402. For example, a touch and hold input received at block 1306 may include a beginning at and/or otherwise characterized by the point in time at which the hand 422 first and/or initially contacts the display 402. The touch and hold input may also include an end at and/or otherwise characterized by the point in time at which contact, such as continuous and/or substantially uninterrupted contact, between the hand 422 and the display 402 is discontinued. In such examples, the touch and hold input may also include a duration defined by the beginning and the end. For example, the duration of the touch and hold input may be the amount of time elapsed between the beginning and the end. Such a duration may be, for example, the amount of time during which uninterrupted contact between the hand 422 and the display 402 is maintained.

When the touch and hold input is received via the thumbnail 410(1), the media message engine 108 may receive an additional content segment as long as the surface and/or portion of the display 402 corresponding to the thumbnail 410(1) is contacted by the hand 422 of the user 116. For example, at block 1308 the media message engine 108 may control one or more of the user interface devices 314 to capture an additional digital content segment 112 in response to the input received at block 1306. In the example method 1300 of FIG. 13, the additional digital content segment 112 may comprise an audio segment 112(2), such as a digital audio segment or other like input captured by a microphone or other user interface device 314 of the electronic device 104 while the surface and/or portion of the display 402 corresponding to the thumbnail 410(1) is contacted by the hand 422 of the user 116.

Additionally, a duration of the audio segment 112(2) captured at block 1308 may be defined by the duration of the touch and hold input received at 1306. For example, the audio segment 112(2) may include a beginning corresponding to the beginning of the touch and hold input. The audio segment 112(2) may also include an end corresponding to the end of the touch and hold input. In such examples, the duration of the audio segment 112(2) may be the amount of time elapsed between the beginning and the end of the audio segment 112(2), and such a duration may be equal to the duration of the touch and hold input received at block 1306. For example, the initial contact between the display 402 and the hand 422 of the user 116 may commence capturing of the audio segment 112(2), and the discontinuation of contact between the display 402 and the hand 422 may cease capturing of the audio segment 112(2).

At block 1310, the media message engine 108 may form a combined segment for inclusion in the digital media message 114. In particular, the media message engine 108 may combine, in response to the touch and hold input received at block 1306, for example, the digital video segment 112(1) received at block 1302 with the digital audio segment 112(2) captured at block 1308. In such an example, the digital video segment 112(1) may include the audio track 1402 and video track 1404 described above with respect to FIG. 14. Accordingly, at block 1310 the media message engine 108 may replace at least a portion of (and in some examples, all of) the audio track 1402 of the digital video segment 112(1) corresponding to the thumbnail 410(1) at which the input was received, with the audio segment 112(2) captured at block 1308. In such examples, the audio segment 112(2) will be merged and/or otherwise combined with a corresponding portion 1408 of the video track 1404, and together, the audio segment 112(2) and the corresponding portion 1408 of the video track 1404 may comprise at least part of the combined segment formed by the media message engine 108 at block 1310.

In any of the embodiments described herein, the media message engine 108 may configure the combined segment formed at block 1310 such that the digital content segments 112 included in the combined segment are presented simultaneously when the digital media message 114 is played. For example, the media message engine 108 may configure the combined segment such that the portion 1408 of the video track 1404 is presented simultaneously with the audio segment 112(2) captured at block 1308 when the digital media message 114 is played.

In some examples, the entire duration of the digital media message 114 may be equal to and/or may otherwise be defined by the duration of the combined segment. In such examples, the digital media message 114 may be comprised entirely of the combined segment. Further, in such examples, the duration of the digital media message 114 may be equal to and/or may otherwise be defined by the duration of one or more of the digital content segments 112 used by the media message engine 108 to generate the combined segment at block 1310. For example, the duration of the digital media message 114 may be equal to and/or may otherwise be defined by the duration of the digital audio segment 112(2) captured at block 1308. In additional examples, the duration of the digital media message 114 may be equal to and/or may otherwise be defined by the sum of the duration of the audio segment 112(2) and a duration of a remainder 1410 of the video track 1404. In such examples, the duration of the digital media message 114 may be equal to and/or may otherwise be defined by the duration of the digital video segment 112(1).

In some examples, more than one touch and hold inputs and/or other inputs may be received during the generation of a digital media message 114. For example, the input described above with respect to block 1306 may comprise a first touch and hold input, and a second touch and hold or other input may be received from the user 116 at block 1312. In some examples, the second touch and hold input may be received at block 1312 via the display 402 (e.g., via the first portion 404 of the display 402) while the first touch and hold input is being received. Such an example is illustrated by the user interface 1500 shown in FIG. 15. In the example of FIG. 15, the initial contact between the display 402 and a first hand 422(1) of the user 116 may commence capturing of the audio segment 112(2), and receiving the second touch and hold input at block 1312 via a second hand 422(2) of the user 116, while the first input is being received in the second portion 408, may at least temporarily cease capturing of the audio segment 112(2). As a result, at least a portion of a remainder 1502 of the audio track 1402 may be included in the combined segment and/or in the resulting digital media message 114 with a corresponding portion of the remainder 1410 of the video track 1404. In particular, the remainder 1502 of the audio track 1402 may be presented simultaneously with the corresponding remainder 1410 of the video track 1404 when the digital media message 114 is played. Accordingly, in such examples, a duration of the digital media message 114 may be defined by the duration of the first touch and hold input received at block 1306, and the duration of the second touch and hold input received at block 1312 may be less than the duration of the first touch and hold input received at block 1306.

In some examples, more than one touch and hold input and/or other input may be received from the user 116 at block 1312 (e.g., via the first portion 404 of the display 402) while the first touch and hold input is being received. For example, as noted above, receiving the second touch and hold input at block 1312 via the second hand 422(2) of the user 116, while the first input is being received in the second portion 408, may at least temporarily cease capturing of the audio segment 112(2). As long as the first hand 422(1) remains in contact with the second portion 408 (e.g., at the thumbnail 410(1)), however, the media message engine 108 may add a first portion 1504 of the remainder 1502 of the audio track 1402 to the digital media message 114 along with a corresponding first portion 1506 of the remainder 1410 of the video track 1404. In this way, the first portions 1504, 1506 will be presented simultaneously when the digital media message 114 is played. Moreover, receiving an additional (e.g., a third) touch and hold input at block 1312 via the second hand 422(2) of the user 116, while the first input is being received in the second portion 408, may cause device 104 to capture yet another audio segment 112(3). For example, in response to receiving such a third touch and hold input at block 1312, the processor 302 and/or the media message engine 108 may control the microphone or other user interface device 314 of the electronic device 104 to capture the audio segment 112(3).

Additionally, a duration of the audio segment 112(3) may be defined by the duration of the corresponding third touch and hold input. For example, the audio segment 112(3) may include a beginning corresponding to the beginning of the third touch and hold input, and an end corresponding to the end of the third touch and hold input. In such examples, the duration of the audio segment 112(3) may be the amount of time elapsed between the beginning and the end thereof, and such a duration may be equal to the duration of the third touch and hold input received at block 1206. For example, the initial contact between the display 402 and the hand 422 of the user 116 associated with the third touch and hold input may commence capturing of the audio segment 112(3), and the discontinuation of contact between the display 402 and the hand 422 associated with the third touch and hold input may cease capturing of the audio segment 112(3).

In such examples, the media message engine 108 may combine, at least partly in response to the third touch and hold input, the digital video segment 112 received at block 1302 with the additional audio segment 112(3). For example, the media message engine 108 may replace at least a portion of the remainder 1502 of the audio track 1402 with the additional audio segment 112(3). In this way, the media message engine 108 may configure the combined segment such a second portion 1508 of the remainder 1410 of the video track 1404 is presented simultaneously with the audio segment 112(3) when the digital media message 114 is played. Such steps may be repeated numerous times in order to create the combined segment described above. Accordingly, additional touch and hold inputs may cause additional corresponding audio segments 112 to be captured and included in the combined segment. In any of the examples described with respect to FIG. 13, the duration of the combined segment may be defined by and/or equal to the duration of the underlying digital video segment 112(1).

At block 1314, the media message engine 108 may provide the digital media message 114 for sharing with a remote electronic device 118, and the digital media message 114 may include at least the combined segment formed at block 1310. In example embodiments, providing the digital media message 114 for sharing at block 1314 may include, among other things, directing the digital media message 114, via the electronic device 104, to the network 106. Accordingly, similar to the process described above with respect to block 1214 of FIG. 12, the digital media message 114 may be transferred over the network 106, and may be provided to a remote user 120 via at least one of a text message, an email, and/or a website, such as a social media website.

In any of the example embodiments described herein, replacing, for example, a portion of a first digital content segment 112(1) (e.g., at least a portion of a video track 1404 of a digital video segment) with a second digital content segment 112(2) (e.g., a digital image) may reduce the file size and/or memory requirements of the first digital content segment 112(1) and/or of a combined segment formed by combining the second digital content segment 112(2) with the first digital content segment 112(1). In some examples, a replaced portion of a video track 1404 of the first digital content segment 112(1) may be rendered at approximately 300 frames/second for a duration of the portion of the video track 1404, and would be characterized by a commensurate memory and/or file size (e.g., in bytes). The digital image of the second digital content segment 112(2), on the other hand, may comprise a single frame that will be rendered for the duration of the replaced portion of the video track 1404. Thus, replacing a portion of the video track 1404 of the first digital content segment 112(1) with the digital image of the second digital content segment 112(2) may reduce the number of frames/second of the combined segment, thereby reducing the file size thereof relative to the unaltered first digital content segment 112(1). As a result, a digital media message 114 generated using such techniques will have a smaller file size and will require/take up less memory than a corresponding digital media message generated using the first digital content segment 112(1) with the video track 1404 unchanged (e.g., without replacing a portion of the video track 1404 with a selected digital image).

Reducing the file size and/or memory requirements of digital media messages 114 in this way has many technical effects and/or advantages. For example, such a reduction in file size and/or memory requirements will enable the various networks 106, servers 102, and/or electronic devices 104, 118 described herein to transfer such digital media messages 114 more quickly and with fewer network, server, and/or device resources. As a result, such a reduction in file size and/or memory requirements will reduce overall network load/traffic, and will improve network, server, and/or electronic device performance. As another example, such a reduction in file size and/or memory requirements will enable the various networks 106, servers 102, and/or electronic devices 104, 118 described herein to provide, render, display, and/or otherwise process such digital media messages 114 more quickly and with fewer network, server, and/or device resources. In particular, such a reduced file size may reduce the server and/or electronic device memory required to receive and/or store such messages 114. Such a reduced file size may also reduce the server and/or electronic device processor load required to provide, render, display, and/or otherwise process such digital media messages 114. As a result, such a reduction in file size and/or memory requirements will reduce overall network load/traffic, and will improve network, server, and/or electronic device performance and efficiency.

In summary, example embodiments of the present disclosure provide devices and methods for generating digital media messages as a means for communication between users in remote locations. Such digital media messages include various combinations of audio, video, images, photos, and/or other digital content segments, and can be quickly and artfully created by each user with little effort. For example, the user may combine a wide variety, and a large number, of different digital content segments into a single digital media message. The methods of generating such a digital media message described herein enable the user to utilize a wide array of audio, video, and/or photo editing controls to quickly and easily modify each individual content segment, or combinations thereof. As a result, such methods provide the user with great artistic freedom in creating the digital media message. Additionally, the methods described herein may be performed using a minimum number of gestures or other such inputs. As a result, such methods enable the user to generate content-rich digital media messages 114 relatively quickly, thereby facilitating the use of such digital media messages as an efficient means of communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of generating a digital media message, comprising:
    rendering a thumbnail at a particular location on a touch-sensitive display of an electronic device, the thumbnail being representative of a digital video segment corresponding to the thumbnail, wherein the digital video segment is stored in a memory associated with the electronic device, the digital video segment including an audio track and a video track;
    receiving a touch and hold input at the particular location, wherein the touch and hold input indicates selection of the digital video segment;
    while receiving the touch and hold input, capturing an audio segment, using a microphone of the electronic device, the audio segment having a duration corresponding to a first period of time over which the touch and hold input is received; and
    combining the digital video segment and the audio segment in response to the touch and hold input such that the audio segment replaces at least part of the audio track of the digital video segment, the video track of the digital video segment is presented simultaneously with the audio segment when the digital media message is played, and a second period of time that the video track is presented is determined based on the duration of the captured audio segment.

2. The method of claim 1, wherein the digital video segment image corresponding to the thumbnail is rendered within a first portion of the display in response to the touch and hold input.

3. The method of claim 2, wherein the thumbnail is rendered in a second portion of the display, with a plurality of additional thumbnails, while the digital video segment is rendered within the first portion, each thumbnail of the plurality of additional thumbnails being representative of a respective additional digital video segment stored in the memory.

4. The method of claim 2, wherein the thumbnail is rendered in a second portion of the display, with at least one additional thumbnail, while the digital video segment rendered within the first portion, the at least one additional thumbnail being representative of a digital video segment stored in the memory.

5. The method of claim 1, wherein a duration of the digital media message is defined by the duration of the digital content segment.

6. The method of claim 1, further including providing the digital media message for sharing with an additional electronic device.

7. The method of claim 1, wherein the beginning of the touch and hold input is characterized by an initial contact between the display and a hand of a user of the electronic device, the end of the touch and hold input is characterized by a discontinuation of contact between the display and the hand, and the hand maintains contact with the display for the duration of the touch and hold input.

8. The method of claim 7, wherein the initial contact between the display and the hand commences capturing of the digital content segment, and the discontinuation of contact ceases capturing of the digital content segment.

9. A method of generating a digital media message, comprising: rendering a thumbnail at a particular location on a touch-sensitive display of an electronic device, the thumbnail being representative of a digital video segment corresponding to the thumbnail, wherein the digital video segment is stored in a memory associated with the electronic device, the digital video segment including an audio track and a video track;
    receiving a touch and hold input at the particular location, wherein the touch and hold input indicates selection of the digital video segment;
    while receiving the touch and hold input, capturing an digital audio segment, using a microphone of the electronic device, the audio segment having a duration corresponding to a first period of time over which the touch and hold input is received; and
    combining the digital video segment and the digital audio segment in response to the touch and hold input such that the digital audio segment replaces at least part of the audio track of the digital video segment, the video track of the digital video segment is presented simultaneously with the digital audio segment when the digital media message is played, and a second period of time that the video track is presented is determined based on the duration of the captured audio segment.

10. The method of claim 9, wherein a duration of the digital audio segment is defined by the duration of the touch and hold input, and wherein a duration of the digital media message is defined by the duration of the digital audio segment.

11. The method of claim 9, wherein:
    the beginning of the touch and hold input is characterized by an initial contact between the display and a hand of a user of the electronic device,
    the end of the touch and hold input is characterized by a discontinuation of contact between the display and the hand,
    the hand maintains contact with the display for the duration of the touch and hold input, and
    the touch and hold input comprises a first touch and hold input.

12. The method of claim 11, wherein the initial contact between the display and the hand commences capturing of the digital audio segment, and the discontinuation of contact ceases capturing of the digital audio segment.

13. The method of claim 11, further comprising receiving a second touch and hold input via the display while receiving the first touch and hold input, wherein:
the initial contact between the display and the hand commences capturing of the digital audio segment, and
receipt of the second touch and hold input ceases capturing of the digital audio segment.

14. The method of claim 13, wherein:
the at least part of the audio track of the digital video segment comprises a first part of the audio track,
receipt of the second touch and hold input causes a second part of the audio track to be presented simultaneously with a corresponding part of the video track when the digital media message is played.

15. The method of claim 13, wherein a duration of the digital media message is defined by the duration of the first touch and hold input, and a duration of the second touch and hold input is less than the duration of the first touch and hold input.

16. A method of generating a digital media message, comprising:
rendering a plurality of thumbnails on a touch-sensitive display of an electronic device, a first thumbnail of the plurality of thumbnails being rendered at a first location on the display and being representative of digital image stored in a memory associated with the electronic device;
receiving a touch and hold input at the first location, wherein the touch and hold input indicates selection of the digital image;
capturing a first digital audio segment, using a microphone of the electronic device, in response to the touch and hold input; and
combining the first digital audio segment with the selected digital image in response to the touch and hold input such that the digital image is presented simultaneously with the first digital audio segment when the digital media message is played and where a period of time that the digital image is presented is determined based on the duration of the first digital audio segment.

17. The method of claim 16, wherein:
the first digital audio segment is combined with the digital image,
an initial contact between the display and a hand of a user of the device commences capturing of the first digital audio segment,
a discontinuation of contact between the display and the hand ceases capturing of the first digital audio segment, and
a duration of the first digital audio segment defines a duration of the digital media message.

18. The method of claim 16, further comprising:
receiving a touch and hold input at a second location corresponding to a representation of a digital video segment, wherein the touch and hold input indicates selection of the digital video segment;
capturing a second digital audio segment, using a microphone of the electronic device, in response to the touch and hold input;
combining the second digital audio segment with the digital video segment, wherein the digital video segment includes an audio track and a video track, and wherein combining the digital audio segment with the digital video segment includes replacing at least part of the audio track with the second digital audio segment such that the video track of the digital video segment is presented simultaneously with the audio segment when the digital media message is played.

19. The method of claim 1, wherein the video track of the digital video segment comprises a single frame corresponding to a still image.

\* \* \* \* \*